United States Patent
Gutman et al.

(10) Patent No.: US 11,558,088 B1
(45) Date of Patent: Jan. 17, 2023

(54) CLOSED LOOP SPATIAL INTERFERENCE CONTROL IN FULL DUPLEX

(71) Applicant: QUALCOMM Incorporated, San Diego, CA (US)

(72) Inventors: Igor Gutman, Hod Hasharon (IL); Navid Abedini, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/476,280

(22) Filed: Sep. 15, 2021

(51) Int. Cl.
*H04B 7/06* (2006.01)
*H04B 7/0426* (2017.01)
*H04L 5/14* (2006.01)
*H04B 7/08* (2006.01)

(52) U.S. Cl.
CPC .......... *H04B 7/043* (2013.01); *H04B 7/0695* (2013.01); *H04B 7/088* (2013.01); *H04L 5/14* (2013.01)

(58) Field of Classification Search
CPC ...... H04B 7/043; H04B 7/0695; H04B 7/088; H04L 5/14
See application file for complete search history.

(56) References Cited

U.S. PATENT DOCUMENTS

| | | | | |
|---|---|---|---|---|
| 2020/0212989 A1* | 7/2020 | Reial | ................. | H04B 7/0469 |
| 2021/0273686 A1* | 9/2021 | Jansson | ................. | H04B 7/0408 |
| 2022/0149907 A1* | 5/2022 | Goransson | ........... | H04B 7/0695 |
| 2022/0225325 A1* | 7/2022 | Alizadeh | ............. | H04B 7/0617 |

* cited by examiner

*Primary Examiner* — Kenneth T Lam
(74) *Attorney, Agent, or Firm* — Qualcomm Incorporated

(57) ABSTRACT

Methods, systems, and devices for wireless communications are described. A base station may manage a shape of a beam to selectively reduce interference at one or more wireless nodes. The base station may receive a capability message from a first wireless node indicating a capability of the first wireless node to support one or more beam tapering configurations. In some cases, the base station may receive an interference report from a second wireless node, indicating that the first wireless node caused interference at the second wireless node. The base station may transmit a beam tapering configuration of the one or more beam tapering configurations to the first wireless node, and the first wireless node may transmit a beamformed message to the base station according to the beam tapering configuration. In some cases, the beam tapering configuration may be associated with less interference when transmitting the beamformed message.

30 Claims, 18 Drawing Sheets

CLOSED LOOP SPATIAL INTERFERENCE CONTROL IN FULL DUPLEX

FIELD OF TECHNOLOGY

The following relates to wireless communications, including closed loop spatial interference control in full duplex.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Some UEs experience cross interference (CI) caused by other wireless devices, self-interference (SI), or both.

SUMMARY

The described techniques relate to improved methods, systems, devices, and apparatuses that support closed loop spatial interference control in full duplex. Generally, described techniques relate to improved techniques, devices, and apparatuses that support closed loop spatial interference control in full duplex (FD). The described techniques may enable a base station to manage a shape of a beam to selectively reduce interference (e.g., cross-interference (CI), self-interference (SI), or both) at one or more wireless nodes. The base station may receive a capability message from a first wireless node indicating a capability of the first wireless node to support one or more beam tapering configurations. In some cases, the base station may receive an interference report from a second wireless node, indicating that the first wireless node caused CI at the second wireless node. The base station may transmit an indication of a beam tapering configuration of the one or more beam tapering configurations to the first wireless node, and the first wireless node may transmit a beamformed message to the base station according to the beam tapering configuration. In some cases, transmitting according to the beam tapering configuration may enable the first wireless node to transmit the beamformed message while reducing CI, SI, or both.

A method for wireless communications at a wireless node is described. The method may include transmitting, to a base station, a capability message indicating that the wireless node supports a set of multiple beam tapering configurations, receiving, from the base station, an indication of a beam tapering configuration of the set of multiple beam tapering configurations based on the capability message, and transmitting a message that is beamformed according to the beam tapering configuration.

An apparatus for wireless communications at a wireless node is described. The apparatus may include a memory, and a processor coupled with the memory and configured to cause the apparatus to transmit, to a base station, a capability message indicating that the wireless node supports a set of multiple beam tapering configurations, receive, from the base station, an indication of a beam tapering configuration of the set of multiple beam tapering configurations based on the capability message, and transmit a message that is beamformed according to the beam tapering configuration.

Another apparatus for wireless communications at a wireless node is described. The apparatus may include means for transmitting, to a base station, a capability message indicating that the wireless node supports a set of multiple beam tapering configurations, means for receiving, from the base station, an indication of a beam tapering configuration of the set of multiple beam tapering configurations based on the capability message, and means for transmitting a message that is beamformed according to the beam tapering configuration.

A non-transitory computer-readable medium storing code for wireless communications at a wireless node is described. The code may include instructions executable by a processor to transmit, to a base station, a capability message indicating that the wireless node supports a set of multiple beam tapering configurations, receive, from the base station, an indication of a beam tapering configuration of the set of multiple beam tapering configurations based on the capability message, and transmit a message that is beamformed according to the beam tapering configuration.

In some examples of the method, apparatuses, and non-transitory computer-readable medium described herein, receiving the indication of the beam tapering configuration may include operations, features, means, or instructions for receiving the indication of the beam tapering configuration including a set of beam tapering parameters, a set of beam tapering functions, an indication of a beam shape, a beam identifier, or any combination thereof.

In some examples of the method, apparatuses, and non-transitory computer-readable medium described herein, receiving the indication of the beam tapering configuration may include operations, features, means, or instructions for receiving the indication of the beam tapering configuration including a bit map defining a transmission pattern for utilizing one or more beam tapering configurations of the set of multiple beam tapering configurations over a set of multiple time slots.

In some examples of the method, apparatuses, and non-transitory computer-readable medium described herein, receiving the indication of the beam tapering configuration may include operations, features, means, or instructions for receiving the indication of the beam tapering configuration including an indication that the beam tapering configuration may be associated with a resource type.

In some examples of the method, apparatuses, and non-transitory computer-readable medium described herein, receiving the indication of the beam tapering configuration may include operations, features, means, or instructions for receiving the indication of the beam tapering configuration including an indication that the beam tapering configuration may be associated with a mode of operation, where the mode of operation includes a half-duplexing mode, an FD mode, an enhanced duplexing mode, a spatial division multiplexing mode, or any combination thereof.

In some examples of the method, apparatuses, and non-transitory computer-readable medium described herein, receiving the indication of the beam tapering configuration may include operations, features, means, or instructions for receiving the indication of the beam tapering configuration including an indication that the beam tapering configuration may be associated with a traffic type or a channel type.

In some examples of the method, apparatuses, and non-transitory computer-readable medium described herein, receiving the indication of the beam tapering configuration may include operations, features, means, or instructions for receiving the indication of the beam tapering configuration including an indication that the beam tapering configuration may be associated with a geographic location, a permitted velocity, one or more mobility parameters, or any combination thereof.

In some examples of the method, apparatuses, and non-transitory computer-readable medium described herein, transmitting the capability message may include operations, features, means, or instructions for transmitting the capability message including a set of supported beam tapering parameters, a set of supported beam tapering functions, a set of supported beam shapes, a set of supported beam identifiers, or any combination thereof.

Some examples of the method, apparatuses, and non-transitory computer-readable medium described herein may further include operations, features, means, or instructions for receiving, from the base station, an instruction to transmit one or more signals according to one or more of the set of multiple beam tapering configurations and transmitting, to the base station, the one or more signals according to the one or more of the set of multiple beam tapering configurations, where receiving the indication of the beam tapering configuration may be based on transmitting the one or more signals.

Some examples of the method, apparatuses, and non-transitory computer-readable medium described herein may further include operations, features, means, or instructions for receiving, from the base station, an indication of a quasi co-location (QCL) relationship between the one or more of the set of multiple beam tapering configurations, where receiving the instruction may be based on receiving the indication of the QCL relationship.

In some examples of the method, apparatuses, and non-transitory computer-readable medium described herein, receiving the indication of the beam tapering configuration may include operations, features, means, or instructions for receiving radio resource control (RRC) signaling, a downlink control information (DCI) message, a medium access control (MAC) control element (MAC-CE), or any combination thereof.

In some examples of the method, apparatuses, and non-transitory computer-readable medium described herein, the wireless node includes a user equipment (UE), an integrated access backhaul (IAB) node, a repeater node, a second base station, or any combination thereof.

A method for wireless communications at a base station is described. The method may include receiving, from a first wireless node, a capability message indicating that the first wireless node supports a set of multiple beam tapering configurations, transmitting, to the first wireless node, an indication of a beam tapering configuration of the set of multiple beam tapering configurations for the first wireless node based on an interference measurement, and monitoring for a message that is beamformed according to the beam tapering configuration.

An apparatus for wireless communications at a base station is described. The apparatus may include a memory, and a processor coupled with the memory and configured to cause the apparatus to receive, from a first wireless node, a capability message indicating that the first wireless node supports a set of multiple beam tapering configurations, transmit, to the first wireless node, an indication of a beam tapering configuration of the set of multiple beam tapering configurations for the first wireless node based on an interference measurement, and monitor for a message that is beamformed according to the beam tapering configuration.

Another apparatus for wireless communications at a base station is described. The apparatus may include means for receiving, from a first wireless node, a capability message indicating that the first wireless node supports a set of multiple beam tapering configurations, means for transmitting, to the first wireless node, an indication of a beam tapering configuration of the set of multiple beam tapering configurations for the first wireless node based on an interference measurement, and means for monitoring for a message that is beamformed according to the beam tapering configuration.

A non-transitory computer-readable medium storing code for wireless communications at a base station is described. The code may include instructions executable by a processor to receive, from a first wireless node, a capability message indicating that the first wireless node supports a set of multiple beam tapering configurations, transmit, to the first wireless node, an indication of a beam tapering configuration of the set of multiple beam tapering configurations for the first wireless node based on an interference measurement, and monitor for a message that is beamformed according to the beam tapering configuration.

In some examples of the method, apparatuses, and non-transitory computer-readable medium described herein, transmitting the indication of the beam tapering configuration may include operations, features, means, or instructions for transmitting the indication of the beam tapering configuration including a set of beam tapering parameters, a set of beam tapering functions, an indication of a beam shape, a beam identifier, or any combination thereof.

In some examples of the method, apparatuses, and non-transitory computer-readable medium described herein, transmitting the indication of the beam tapering configuration may include operations, features, means, or instructions for transmitting the indication of the beam tapering configuration including a bit map defining a transmission pattern for utilizing one or more beam tapering configurations of the set of multiple beam tapering configurations over a set of multiple time slots.

In some examples of the method, apparatuses, and non-transitory computer-readable medium described herein, transmitting the indication of the beam tapering configuration may include operations, features, means, or instructions for transmitting the indication of the beam tapering configuration including an indication that the beam tapering configuration may be associated with a resource type.

In some examples of the method, apparatuses, and non-transitory computer-readable medium described herein, transmitting the indication of the beam tapering configuration may include operations, features, means, or instructions for transmitting the indication of the beam tapering configuration including an indication that the beam tapering configuration may be associated with a mode of operation, where the mode of operation includes a half-duplexing mode, an FD mode, an enhanced duplexing mode, a spatial division multiplexing mode, or any combination thereof.

In some examples of the method, apparatuses, and non-transitory computer-readable medium described herein, transmitting the indication of the beam tapering configuration may include operations, features, means, or instructions for transmitting the indication of the beam tapering configuration including an indication that the beam tapering configuration may be associated with a traffic type or a channel type.

In some examples of the method, apparatuses, and non-transitory computer-readable medium described herein, transmitting the indication of the beam tapering configuration may include operations, features, means, or instructions for transmitting the indication of the beam tapering configuration including an indication that the beam tapering configuration may be associated with a geographic location, a permitted velocity, one or more mobility parameters, or any combination thereof.

In some examples of the method, apparatuses, and non-transitory computer-readable medium described herein, receiving the capability message may include operations, features, means, or instructions for receiving the capability message including a set of supported beam tapering parameters, a set of supported beam tapering functions, a set of supported beam shapes, a set of supported beam identifiers, or any combination thereof.

Some examples of the method, apparatuses, and non-transitory computer-readable medium described herein may further include operations, features, means, or instructions for transmitting, to the first wireless node, an instruction to transmit one or more signals according to one or more of the set of multiple beam tapering configurations, receiving, from the first wireless node, the one or more signals according to the one or more of the set of multiple beam tapering configurations, and performing one or more measurements on each of the one or more signals, where transmitting the indication of the beam tapering configuration may be based on performing the one or more measurements.

Some examples of the method, apparatuses, and non-transitory computer-readable medium described herein may further include operations, features, means, or instructions for transmitting, to the first wireless node, an indication of a QCL relationship between the one or more of the set of multiple beam tapering configurations, where receiving the one or more signals may be based on transmitting the indication of the QCL relationship.

Some examples of the method, apparatuses, and non-transitory computer-readable medium described herein may further include operations, features, means, or instructions for receiving, from a second wireless node, an interference measurement report including an indication of interference caused by the first wireless node, the second wireless node, or any combination thereof, where transmitting the indication of the beam tapering configuration of the set of multiple beam tapering configurations may be based on receiving the interference measurement report.

In some examples of the method, apparatuses, and non-transitory computer-readable medium described herein, transmitting the indication of the beam tapering configuration may include operations, features, means, or instructions for transmitting RRC signaling, a DCI message, a MAC-CE, or any combination thereof.

In some examples of the method, apparatuses, and non-transitory computer-readable medium described herein, the first wireless node includes a UE, an IAB node, a repeater node, a second base station, or any combination thereof.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
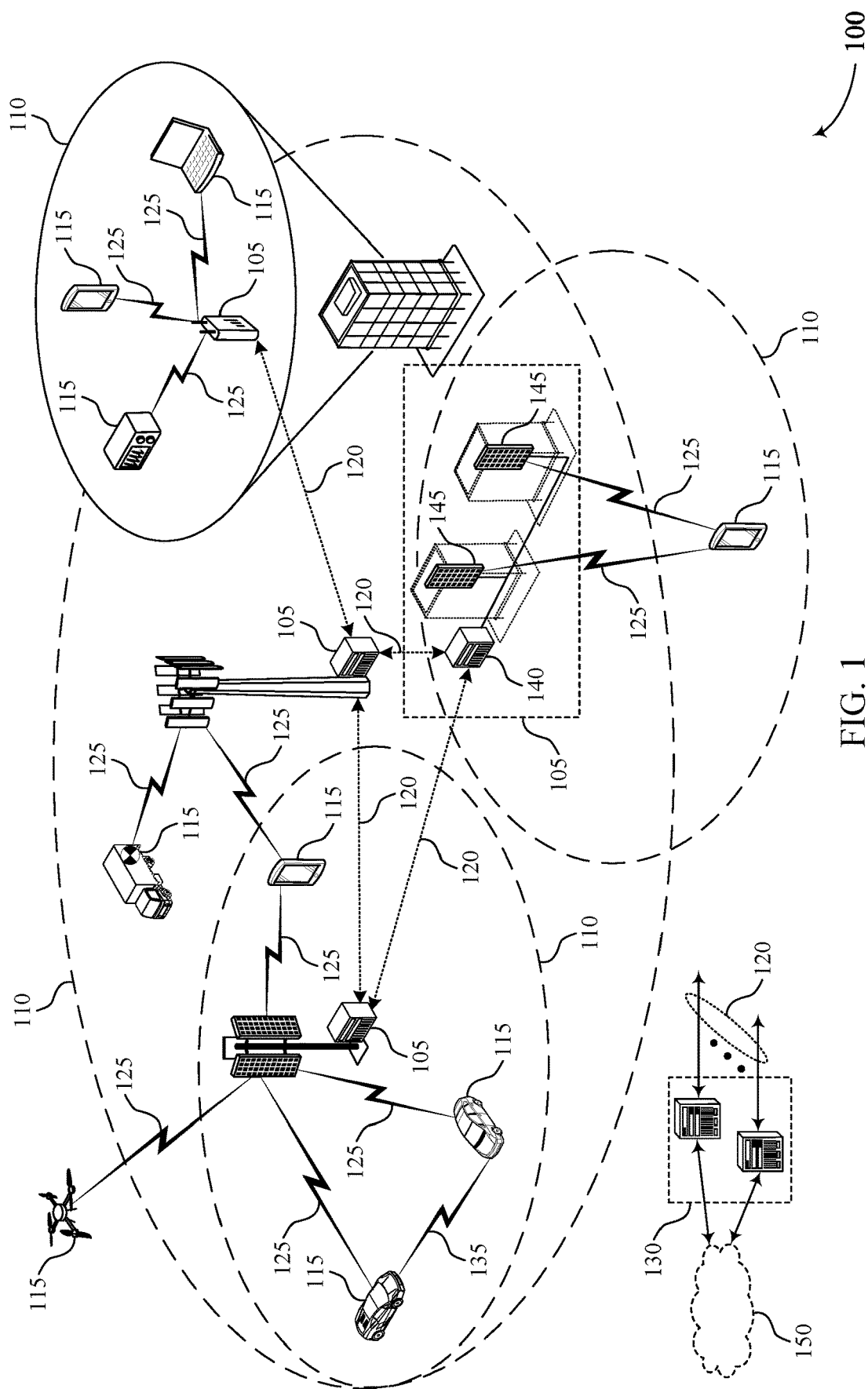
FIG. 1 illustrates an example of a wireless communications system that supports closed loop spatial interference control in full duplex in accordance with aspects of the present disclosure.

In some wireless communications systems, wireless devices may support full duplex (FD) communications. For example, a first wireless node operating in a FD mode may transmit signaling to another wireless node or a base station using a beam, which in some cases may cause self-interference (SI) at the first wireless node, cross-link interference (CI) at other wireless nodes, or both. The first wireless node may generate the beam such that a primary lobe is directed toward the receiving device (e.g., the base station). However, the generated beam may also include one or more sidelobes pointed in various directions (e.g., beam offshoots at angles relative to the primary transmission direction). Such beam sidelobes may cause SI at the first wireless node, CI at other wireless nodes, or both. Such interference at these wireless nodes may result in increased collisions, failed reception of wireless signaling, retransmissions and increased system overhead and latency, decreased reliability of communications, and decreased user experience.

In some cases, a wireless node may transmit signaling using a beam according to a beam tapering configuration. Beam tapering procedures may include adjusting one or more parameter values, such as power output values for power amplifiers (PAs) of the transmitting device, to generate a beam. A beam generated using beam tapering may have sidelobes with lower power, pointed in different directions relative to a primary lobe, or the like. Transmitting according to some beam tapering configurations may enable the wireless node to adjust one or more sidelobes of a beam (e.g., decrease sidelobe size or strength) to decrease CI, SI, or both.

A base station may manage a shape of a beam of a transmitting wireless node to selectively reduce interference (e.g., SI, CI, or both) at one or more wireless nodes. In some cases, the base station may receive interference reports from one or more wireless nodes and may manage the beam shape of the transmitting wireless nodes based on the interference reports. For example, the base station may receive an interference report from another wireless node, and may configure the transmitting wireless node to generate a beam using beam tapering techniques described herein according to a beam tapering configuration. A beam tapering configuration may indicate which power amplification level should be applied at a respective antenna element for transmitting a message beamformed with a desired spatial response. A beam tapering configuration may cause less CI or SI (e.g., a more pencil-like beam shape, that is, corresponding to weaker or smaller sidelobes) compared to a previous beam tapering configuration used by the transmitting wireless node. As described herein, a beam tapering configuration may include an indication of one or more parameters for performing beam tapering to generate a particular spatial response, an indication of a specific beam shape (e.g., of a set of beam shapes), a pattern of beam shapes to use over time, or the like. Thus, transmitting one or more uplink signals according to a beam tapering configuration may include generating a beam using one or more indicated parameter values, selecting an indicated beam shape for sending one or more transmissions, selecting a set of beam shapes for multiple transmissions over time, or the like.

n some cases, the transmitting wireless node may report beam capability information of the transmitting wireless node to the base station so the base station may configure a beam tapering configuration at the transmitting wireless node based on the beam capability information. In some examples, a preferred or allowed beam shape (e.g., included in the beam tapering configuration) may be based on a surrounding environment (e.g., geography, speed of transmitting wireless device) of the transmitting wireless node, the base station, any other wireless node, or any combination thereof. For example, a pencil-like beam shape may be desirable in large cities to minimize CI. In some examples, a preferred or allowed beam shape (e.g., included in the beam tapering configuration) may be based on other factors (e.g., the beam tapering configuration may be resource-dependent, may be dependent on a mode of operation such as FD or half-duplex, may be dependent on a channel/traffic type). In such examples, the beam configuration information may include an indication of relationships between the factors and a particular beam shape, and the transmitting wireless node may select an appropriate beam shape for transmissions based on the configured relationships.

Aspects of the disclosure are initially described in the context of wireless communications systems. Aspects of the disclosure are further illustrated by and described with reference to wireless communications systems, device diagrams, beam tapering schemes, and process flows. Aspects of the disclosure are further illustrated by and described with reference to apparatus diagrams, system diagrams, and flowcharts that relate to closed loop spatial interference control in full duplex.

FIG. 1 illustrates an example of a wireless communications system 100 that supports closed loop spatial interference control in full duplex in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

According to the techniques described herein, a base station 105 may manage a shape of a beam to selectively reduce interference (e.g., cross-interference (CI), self-interference (SI), or both) at one or more wireless nodes (e.g., UEs 115, or any other device). The base station 105 may receive a capability message from a first wireless node indicating a capability of the first wireless node to support one or more beam tapering configurations. In some cases, the base station 105 may receive an interference report from a second wireless node, indicating that the first wireless node caused CI at the second wireless node. The base station 105 may transmit a beam tapering configuration of the one or more beam tapering configurations to the first wireless node, and the first wireless node may transmit a beamformed message to the base station 105 according to the beam tapering configuration. In some cases, transmitting according to the beam tapering configuration may enable the first wireless node to transmit the beamformed message while causing less CI, SI, or both.

Figure 2:
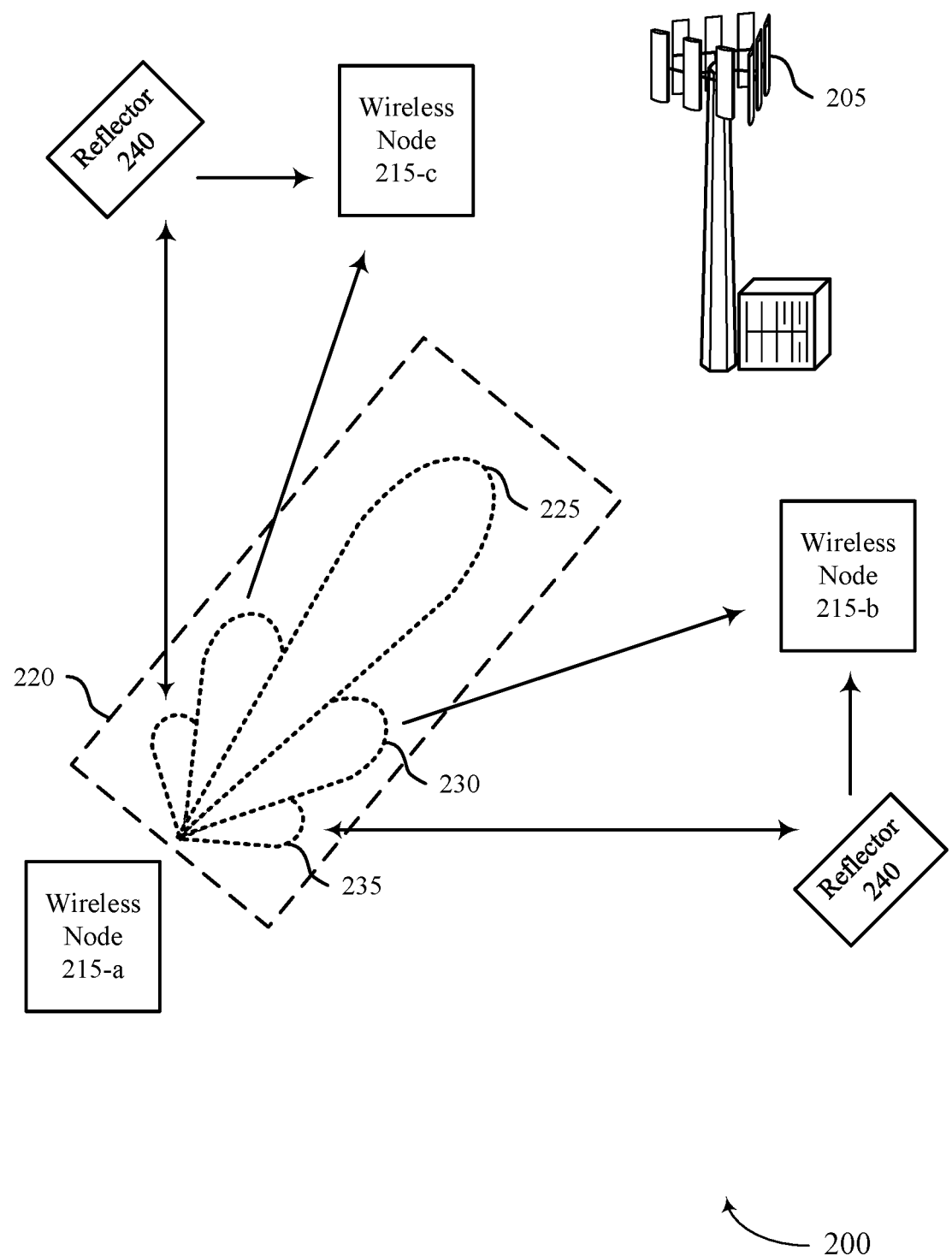
FIG. 2 illustrates an example of a wireless communications system that supports closed loop spatial interference control in full duplex in accordance with aspects of the present disclosure.

FIG. 2 illustrates an example of a wireless communications system 200 that supports techniques for closed loop spatial interference control in FD in accordance with aspects of the present disclosure. The wireless communications system 200 may implement or be implemented by aspects of the wireless communications system 100 as described with reference to FIG. 1. For example, the wireless communications system 200 may include base station 205 and wireless nodes 215, which may be examples of base stations 105 and UEs 115, or any other devices, as described herein. For example, wireless nodes 215 may be examples of UEs 115, integrated access and backhaul (IAB) nodes, repeater nodes, base stations 105 (e.g., gigaNodeBs (gNBs)), or any combination thereof. The wireless communications system 200 may support improvements to interference, processing, power consumption, and more efficient utilization of communication resources, among other benefits.

Wireless nodes 215 and base station 205 may communicate using a full duplex (FD) mode of operation (e.g., in frequency range (FR) 2 bands, or greater). In FD modes of operation, base station 205 may be able to transmit downlink signaling to a wireless node 215 and receive uplink signaling from another wireless node 215 (e.g., at the same time, approximately the same time, within a same time window such as a slot, etc.). Such scenarios may result in a reduction in a likelihood for base station 205 and wireless nodes 215, among other devices, to contend for uplink communication resources and downlink communication resources. Such scenarios may also result in a reduction in communication latency (e.g., in asymmetric links, where a data transfer rate may be different for uplink and downlink communications). In cases where wireless nodes 215 may be an IAB node or a repeater node, base station 205, wireless nodes 215, or any combination thereof, may use route selection algorithms to activate adjacent hops (e.g., simultaneously) where an intermediate wireless node 215 may operate in both downlink and uplink directions, which may reduce a routing delay (e.g., routing latency).

FD operating modes may also support an increased throughput (TPUT) for communications between base station 205 and wireless nodes 215, in comparison with other systems. To transmit with an increased TPUT in non-FD modes of operation, such devices may transmit with a higher signal-to-noise ratio (SNR) in comparison to transmitting in FD modes of operation. For example, for initial SNR values that are greater (e.g., much greater) than 10 decibels (dB) for communications in non-FD systems, such devices may transmit with a higher SNR of $SNR^m$ to increase TPUT for such communications by a factor m. In FR2 (e.g., or greater) bands, such devices may transmit with a limited performance due to one or more impairments (e.g., non-thermal impairments, such as phase noise, PA non-linearity, FDRSB, or any combination thereof), which may limit SNR values for transmission by around 30 dB, or any other dB value. For example, to increase TPUT for a transmission by a factor of 2 (e.g., from 64 QAM to 4096 QAM), such devices may reduce SNR floors by around 20 dB, which may not be desirable for communications using some mmW (millimeter wave) links. Thus, communicating in FR2 bands using FD operating modes may be desirable for increasing communication TPUT without the increased SNR values associated with non-FD operating modes.

However, in an FD operating mode, wireless devices may cause interference when communicating with other wireless devices. For example, wireless node 215-a may transmit signaling using a beam 220 to base station 205, which may cause interference at wireless node 215-a (e.g., referred to as self-interference (SI), where a transmitting device may generate SI (e.g., the receiver of the transmitting wireless node receives some or all of the signaling transmitted by the transmitter of the same wireless node). Transmissions using beam 220 may also cause interference at a wireless node 215 (e.g., cross interference (CI)) at wireless node 215-b or wireless node 215-c or both). Beam 220 may include a primary lobe 225, and one or more sidelobes (e.g., sidelobes 230, and sidelobes 235) pointed in different directions than the primary lobe 225 (e.g., where the spatial direction of sidelobes 230 and sidelobes 235 may be at angles relative to the primary lobe 225). Beam 220 may thus be a non-pencil shaped beam. As such, sidelobes 230, sidelobes 235, or both, may directly cause interference at wireless node 215-b (e.g., CI), wireless node 215-c (e.g., CI), or both, or may reflect off of reflectors 240 to cause interference at wireless node 215-a (e.g., SI), wireless node 215-b (e.g., CI), wireless node 215-c (e.g., CI), or any combination thereof.

In some cases, a wireless node 215-a may transmit signaling using beam 220 according to a beam tapering configuration. Beam tapering configurations may include various parameters for generating and transmitting signaling using the beam 220, including a beam shape, a beam tapering function, other beam tapering parameters, or the like. Transmitting according to some beam tapering configurations may enable the wireless node 215-a to adjust one or more sidelobes of a beam (e.g., decrease sidelobe size or strength) to decrease CI, SI, or both.

To reduce such interference, base station 205 may manage a beam shape of beams 220 (e.g., to be more pencil-like) depending on various factors. In some examples, base station 205 may control interference at various wireless devices by managing TCI states that are allocated to other wireless nodes 215. In some other examples, base station 205 may cooperate with wireless nodes 215 to control the interference. According to the techniques described herein, base station 205 may manage a spatial shape of beams (e.g., manage tapering for such beams) (e.g., including beam 220) of one or more (e.g., all) wireless nodes 215 within a network to optimize an aggregated TPUT of the network, or of a specific wireless node 215.

In some examples, base station 205 may receive interference reports from one or more wireless nodes 215 and may manage a beam shape of wireless node 215-a based on the interference reports. For example, base station 205 may receive an interference report from wireless node 215-b indicating interference (e.g., from sidelobes 230, sidelobes 235, or any combination thereof) by wireless node 215-a, and base station 205 may configure wireless node 215-a to transmit according to a beam tapering configuration that may cause less CI, SI, or both (e.g., a more pencil-like beam shape) compared to a previous beam shape that caused the interference at wireless node 215-b. The beam tapering configuration may include an indication of one or more parameters for performing beam tapering, an indication of a beam shape of a set of beam shapes, a pattern of beam shapes for use over time, or any combination thereof, among other information.

In some cases, wireless node 215-a may report beam capability information of wireless node 215-a to base station 205 so base station 205 may configure a beam tapering configuration at wireless node 215-a based on the beam capability information. In some examples, a preferred or allowed beam shape (e.g., included in the beam tapering configuration) may be based on a surrounding environment (e.g., geography, speed of transmitting wireless device) of wireless node 215-a, wireless node 215-b, wireless node 215-c, base station 205, or any combination thereof. For example, a pencil-like beam shape may be desirable in large cities to reduce or minimize CI. In some examples, a preferred or allowed beam shape (e.g., included in the beam tapering configuration) may be based on other factors (e.g., the beam tapering configuration may be resource-dependent, may be dependent on a mode of operation such as FD or half-duplex, may be dependent on a channel/traffic type). In some examples, base station 205 may instruct wireless node 215-a to transmit one or more signals according to various beam tapering configurations, and may configure wireless node 215-a with an indication of a QCL relationship between the various beam tapering configurations. Base station 205 may measure the one or more signals and may select a beam tapering configuration (e.g., a preferred beam tapering configuration) of the various beam tapering configurations.

In some examples, wireless node 215-a may autonomously modify beam 220 (e.g., a beam spatial response through tapering) based on one or more measurements (e.g., of signaling), received indications, or both. In some cases, wireless node 215-a may receive no signaling (e.g., beam tapering configurations) from other devices that may help wireless node 215-a modify beam 220, and may be able to entirely autonomously modify beam 220. For example, without receiving any indication of beam tapering configurations from base station 205, wireless node 215-a may select a beam tapering configuration (e.g., based on one or more measurements, or one or more interference reports, or the like). In some other cases, wireless node 215-a may be able to autonomously modify beam 220 based on one or more indications received from the base station 205. For example, wireless node 215-a may measure signaling or may receive one or more indications, parameters, configurations, beam shapes, or other signaling from the base station 205, and may select an appropriate beam shape (e.g., may perform beam tapering) based thereon (e.g., without an explicit instruction to do so from base station 205, or based on a beam tapering configuration as described herein).

Figure 3:
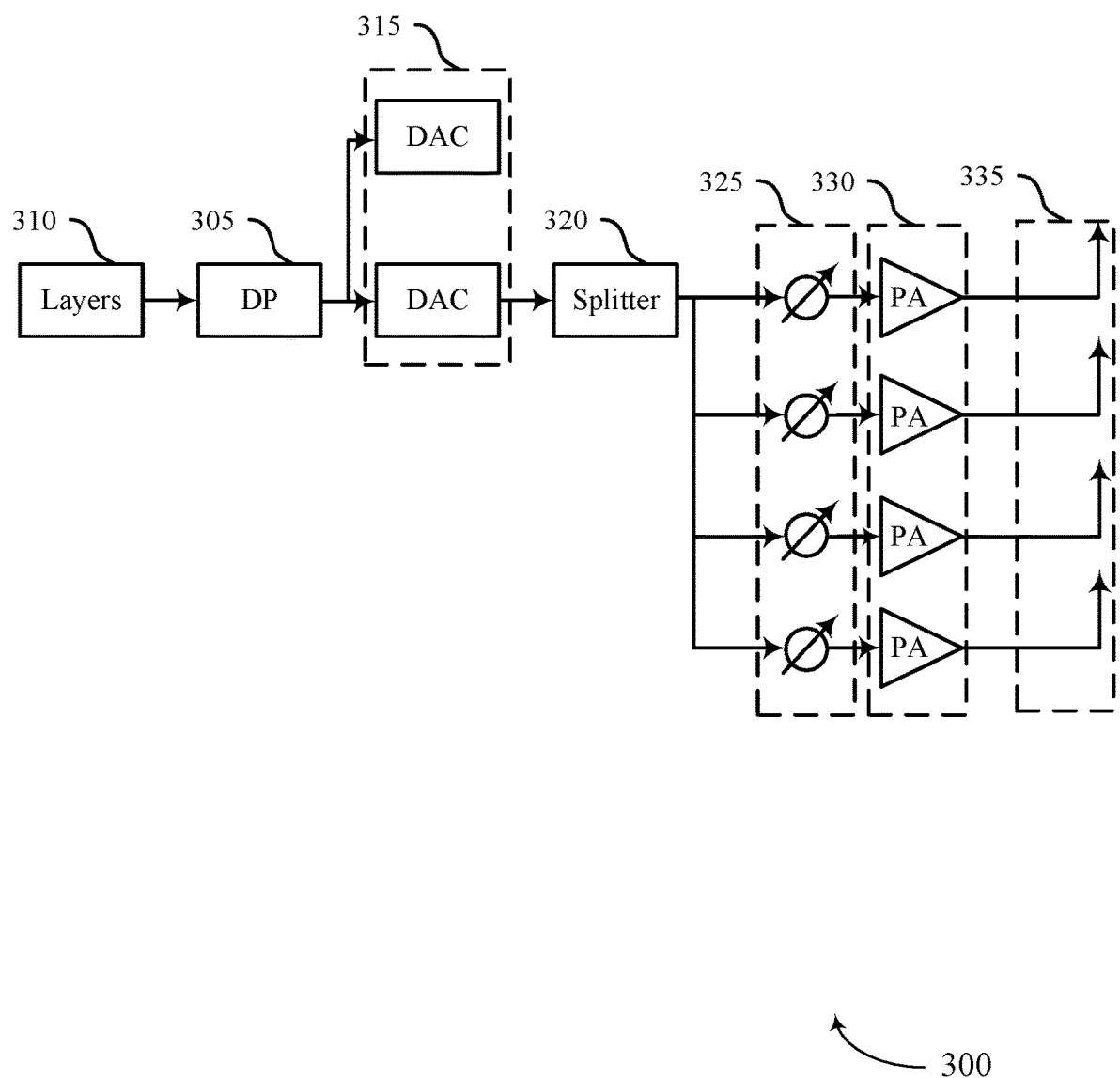
FIG. 3 illustrates an example of a flow diagram that supports closed loop spatial interference control in full duplex in accordance with aspects of the present disclosure.

FIG. 3 illustrates an example of a flow diagram 300 that supports techniques for closed loop spatial interference control in FD in accordance with aspects of the present disclosure. The flow diagram 300 may implement or be implemented by aspects of the wireless communications system 100, wireless communications system 200, or both, as described with reference to FIGS. 1 and 2. For example, the flow diagram 300 may illustrate beamforming techniques at a wireless node, a base station, or any other device, which may be examples of corresponding devices described with reference to FIGS. 1 and 2.

In some wireless communications systems, wireless devices may perform beamforming to generate a beam and transmit using the beam to other wireless devices. Beamforming may be used to steer beams (e.g., determine which direction to transmit using a beamformed beam). In some examples (e.g., mmW communications), wireless devices may perform hybrid beamforming, which may include performing digital precoding (e.g., using digital precoder DP 305) to transfer one or more data layers 310 to one or more antennas. Wireless devices that perform hybrid beamforming may include one or more digital to analog conversion (DAC) components 315, a splitter 320 (e.g., a radio frequency (RF) splitter), one or more analog phase shifters 325 to steer the precoded signal to a direction for the beam, and one or more power amplifiers (PAs) 330 to amplify the signal power and output power $P_{out}$. In some cases, $P_{out}$ from the PAs 330 may be constant to increase (e.g., maximize) a total radiated power (TRP), an effective isotropic radiated power (EIRP), or both while maintaining a target out of band (OOB) emission metric, an in-band error vector magnitude (EVM), or any combination thereof. Outputting constant power $P_{out}$ from PAs 330 may be desirable when there is a low likelihood of CI within a cell (e.g., in time division duplex (TDD) systems, compared to other systems). However, outputting constant power $P_{out}$ from the PAs 330 may not be desirable in FD operating modes where equal power output across PAs 330 may cause a wireless device to generate an undesirable beam pattern, shape, or the like (e.g., a non-pencil like beam shape).

In some examples, as described herein, a transmitting wireless node (e.g., such as a wireless node 215-a) may perform tapering techniques. In such examples, the transmitting wireless node may configure its transmission chain such that some PAs 330 may transmit using less power (e.g., less TRP), resulting in a generated beam (e.g., beam 220) that has an improved sense of spatial response. That is, by adjusting the power output for some PAs 330 (e.g., instead of transmitting such that the $P_{out}$ from PAs 330 is constant), the transmitting wireless node may generate a beam shape with different (e.g., less) power output on sidelobes, and decreased interference in some directions (e.g., where other nodes are located, or with reference to reflectors causing SI, or the like).

Figure 4A:
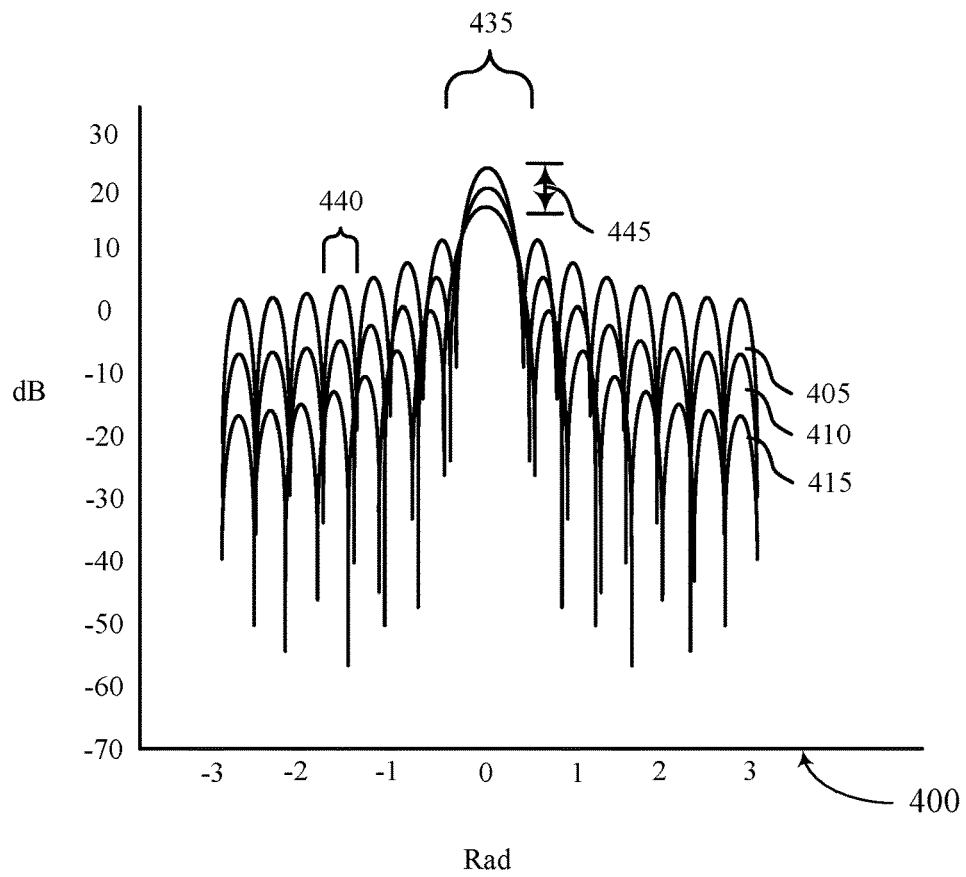
FIG. 4A illustrates an example of a beam tapering scheme that supports closed loop spatial interference control in full duplex in accordance with aspects of the present disclosure.
Figure 4B:
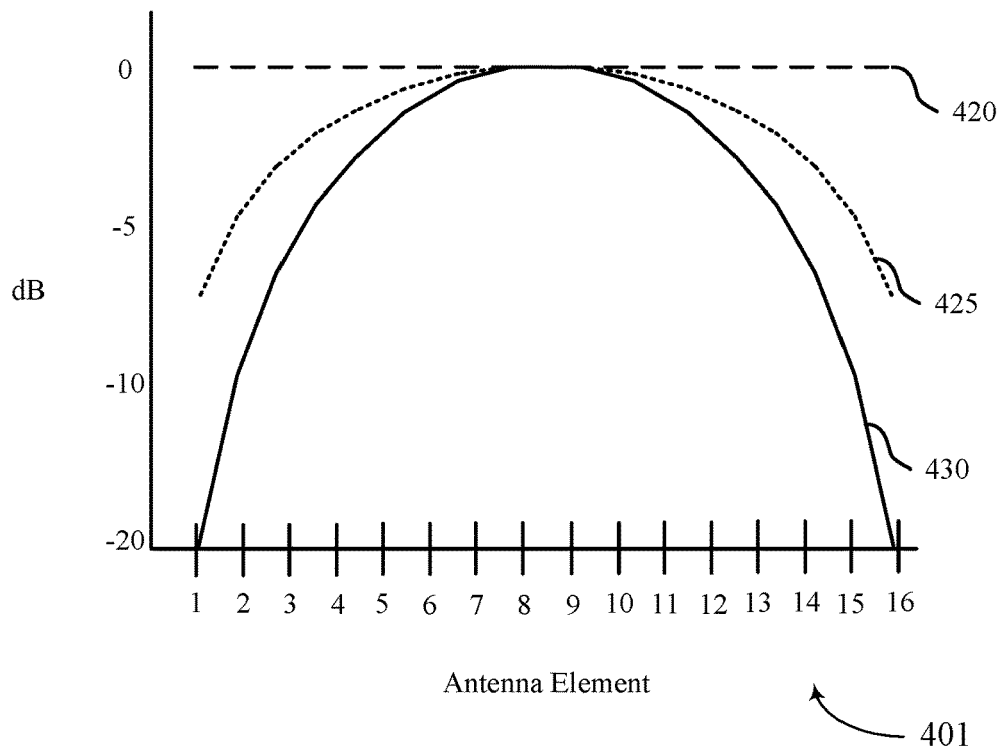
FIG. 4B illustrates an example of a spatial response scheme that supports closed loop spatial interference control in full duplex in accordance with aspects of the present disclosure.

Tapering techniques are described in greater detail with reference to FIG. 4. For example, the transmitting wireless node may include one or more (e.g., four) antenna elements 335. The power applied by respective PAs 330 to respective antenna elements 335 may result in different beam shapes (e.g., including different powers and directions of primary lobes, and different powers and directions of side lobes). Thus, by performing beam tapering as described herein, the transmit power at various antenna elements 335 may steer a beam and generate beam shapes FIG. 4A illustrates an example of a spatial response scheme 400 that supports techniques for closed loop spatial interference control in FD in accordance with aspects of the present disclosure. FIG. 4B illustrates an example of a beam tapering configuration 401. The spatial response scheme 400 and the beam tapering scheme 401 may implement or be implemented by aspects of the wireless communications system 100, wireless communications system 200, or both, as described with reference to FIGS. 1 and 2. For example, beam tapering configuration 401 may be implemented by one or more wireless nodes, which may result in spatial response scheme 400. Such wireless nodes maybe examples of corresponding devices described with reference to FIGS. 1 and 2.

In some wireless communications systems, a wireless node may generate a beam for transmissions to another wireless node according to beam tapering configuration 401. The beam may include one or more lobes, including a primary lobe (e.g., primary lobes 435, which may be examples of primary lobe 225, one or more sidelobes 440, such as sidelobes 230 or sidelobes 235, or the like). Thus, a beam generated beam may direct different power (e.g., in dB) in different directions (e.g., in radians), as illustrated with reference to FIG. 4A.

The wireless node may generate a beam having a spatial response 405, spatial response 410, or spatial response 415 by applying different parameter values (e.g., different power amplifiers by different PAs, resulting in different transmit powers at different antenna elements). For example, the transmitting wireless node may apply a first beam tapering configuration 420, which may include an equal or similar transmit power at each antenna element (e.g., across 16 antenna elements). Beam tapering configuration 420 may result in a spatial response 405. Beam tapering configuration 420 may include applying a same or similar power amplification resulting in a same transmit power across all (e.g., 16) antenna elements (e.g., about 0 dB). Spatial response 405 may include a primary lobe 435 directed at about 0 radians and power output of about 24 dB, sidelobes 440 directed at about −3 radians and 3 radians with a power output of about 0 dB, and sidelobes 440 directed at about −0.5 radians and 0.5 radians, with a power output of about 10 dB, etc. Beam tapering configuration 425 may include varying transmit power at different antenna elements. For example, a power amplification at antenna elements 1 and 16 may be about 8 dB less than the power amplification at antenna 8. Beam tapering configuration 425 may result in spatial response 410. Spatial response 410 may include a primary lobe 445 directed at about 0 radians and power output of about 22 dB, sidelobes 440 directed at about −3 radians and 3 radians with a power output of about −10 dB, and sidelobes 440 directed at about −0.6 radians and 0.6 radians with a power output of about 4 dB. Beam tapering configuration 430 may include different transmit powers across the antenna elements, and may result in spatial response 415. For example, the power amplification at antenna elements 1 and 16 may be 15 dB less than the power amplification at antenna 8. Spatial response 415 may include a primary lobe 445 directed at about 0 radians and power output of about 20 dB, sidelobes 440 directed at about −3 radians and 3 radians with a power output of about −20 dB, and sidelobes 440 directed at about −0.8 radians and 0.8 radians with a power output of about −2 dB. Thus, the different beam tapering configurations (e.g., even if the primary lobe is pointed in the same spatial direction) may result in spatial responses with sidelobes pointed in different direction or having different power outputs.

The wireless node may perform beam tapering for a particular beam by reducing the power output of one or more PAs (e.g., PAs 330 as described with reference to FIG. 3), which may change the power at different antenna elements and reduce the power output of sidelobes 440 for a particular beam, resulting in a more pencil-like beam shape, decreased SI, decreased CI, or the like. For example, tapering configuration 420 may represent a scenario where all of the PAs may be amplifying power (e.g., TRP) such that each antenna element (e.g., of the 16 antenna elements) for a transmission may be transmitting with maximum power or similar power, resulting in higher sidelobe dB levels. Beam tapering configurations 425 and 430 may represent a scenario where some of the PAs may be configured to amplify power such that antenna elements of the transmitting device transmit at different powers, resulting in a lower sidelobe dB level. Some PAs may amplify power more or less than other PAs. For example, PAs corresponding to outer-most antenna elements (e.g., antenna elements including and near antenna elements 0 and 16) may amplify power the least relative to the other PAs for a transmission, such that the outer-most antenna elements transmit with the least power relative to other antenna elements. In some cases, while spatial response 410 and spatial response 415 may correspond to reduced sidelobe dB levels compared to spatial response 405, spatial response 410 and spatial response 415 may result in an EIRP offset 445. That is, by reducing the power of sidelobes 440, a beam tapering configuration (e.g., beam tapering configuration 430) may experience a corresponding decrease in EIRP (e.g., EIRP offset 445). For instance, spatial response 415 (e.g., generated using beam tapering configuration 430) may experience a small reductions in dB levels for the primary lobe 435 (e.g., a reductions in about 2 dB) relative to the EIRP of spatial response 405 (e.g., generated using beam tapering configuration 430). However, techniques described herein may result in relatively small EIRP offset 445 with as compared with corresponding dB decreases for the sidelobes 440 (e.g., reductions of 6 dB or 10 dB, or more, depending on the applied beam tapering configuration).

Beam tapering configuration 420, beam tapering configuration 425, and beam tapering configuration 430 may be defined at least in part by a Hamming function according to equation 1:

$$w = \text{hamming}(1:16)^{1/\xi} \tag{1}$$

where different tapering configurations may correspond to different values of $\xi$. For example, beam tapering configuration 420 and resulting spatial response 405 may correspond to $\xi = \infty$, beam tapering configuration 425 and resulting spatial response 410 may correspond to $\xi = 4$, and beam tapering configuration 430 and resulting spatial response 415 may correspond to $\xi = 2$. Thus, larger values $\xi$ may correspond to a more rectangular transmission windows (e.g., each of the PAs may amplify the signal with the same power, and each of the antenna elements may transmit with the same power). The spatial response of larger $\xi$ values may be close to a SINC function (e.g., may closely represent a SINC function), which correspond to increased interference. Smaller $\xi$ values may correspond to a reduction in sidelobe power, and a relatively smaller reduction in EIRP for a transmission (e.g., at a primary lobe power) in comparison to the reduction in sidelobe power. For example, a change from $\xi = \infty$ (e.g., beam tapering configuration 420) to $\xi = 2$ (e.g., beam tapering configuration 430) may correspond to around a 20 dB reduction in sidelobe dB levels, and around a 3.5 dB reduction in EIRP. That is, by changing from beam tapering configuration 420 to beam tapering configuration 430, a transmitting wireless node may reduce the transmit power of side lobes 440 by 20 dB (e.g., from 0 or 2 dB to −20 dB), and may experience a EIRP offset 445 of only about 3.5 dB. Thus, the EIRP loss in the primary lobe 435 of spatial response 405 relative to the primary lobe of spatial response 415 is about 3.5 dB, but beneficially the sidelobes 440 of spatial response 415 are each approximately 20 dB lower than the sidelobes 440 of spatial response 405. Thus, tapering configuration 430 has much lower interference caused by its sidelobes 440 as compared to tapering configuration 420, while having comparable amounts power in their respective primary lobes 435.

To achieve reduced interference levels, a wireless node may be able to transmit according to a beam tapering configuration by substantially reducing a power or direction of sidelobes 440, but beam tapering may also decreasing a power of the primary lobe 435 (e.g., EIRP for the beam shape). To selectively reduce interference (e.g., at a cost to EIRP) or maintain high EIRP (e.g., at a cost to interference), a base station may manage a beam shape of the wireless node based on one or more factors, as described further with reference to FIGS. 5 and 6. In some examples, as described with reference to FIGS. 5 and 6, the base station may indicate, to the wireless node, with one or more beam tapering configurations (e.g., including parameters for generating a particular spatial response, an indication of a particular beam shape or spatial response, a pattern of beam shapes to use or apply over time or during specific resources, or the like). The UE can generate one or more spatial responses according to the indicated bema tapering configurations.

Figure 5:
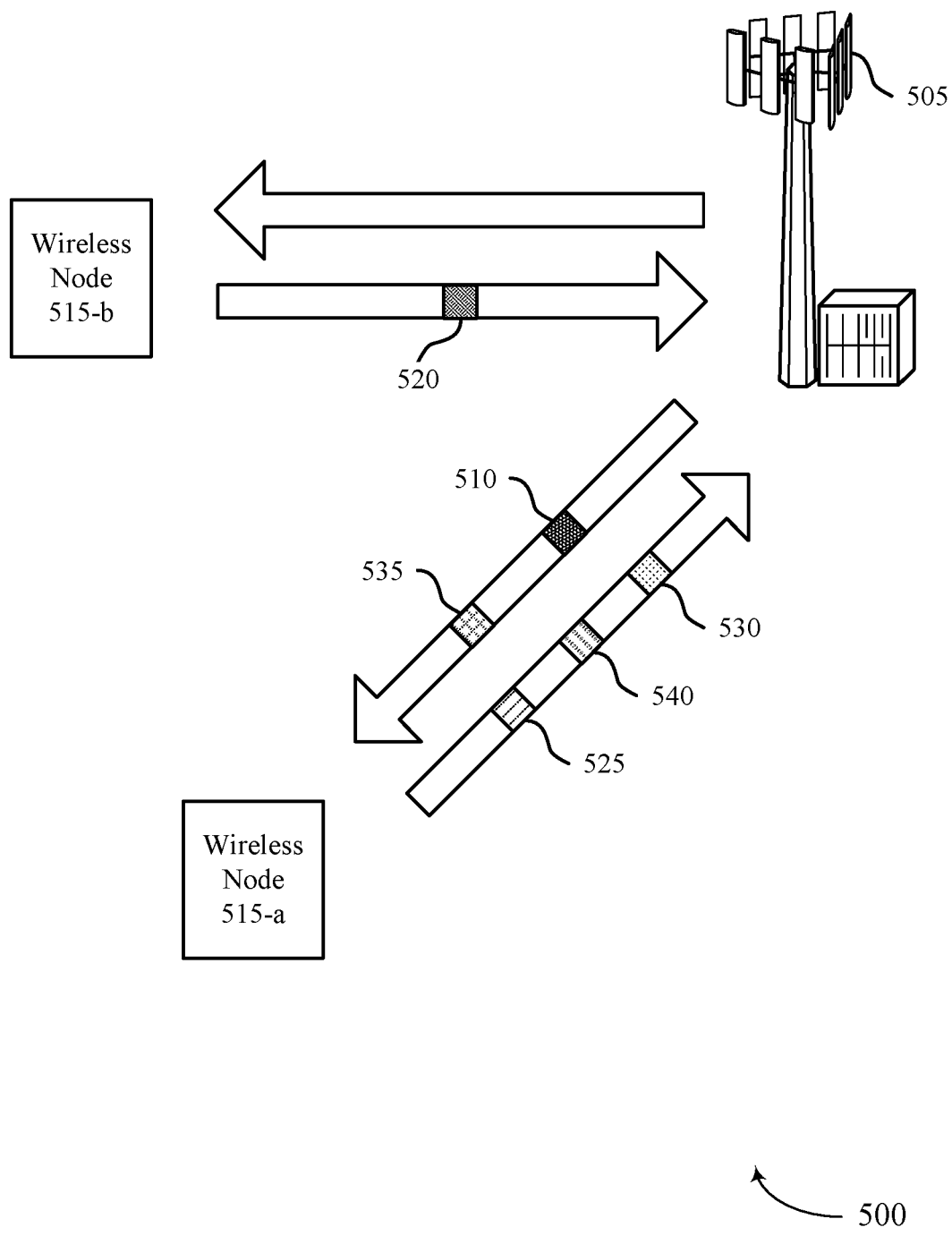
FIG. 5 illustrates an example of a wireless communications system that supports closed loop spatial interference control in full duplex in accordance with aspects of the present disclosure.

FIG. 5 illustrates an example of a wireless communications system 500 that supports techniques for closed loop spatial interference control in FD in accordance with aspects of the present disclosure. The wireless communications system 500 may implement or be implemented by aspects of the wireless communications system 100, the wireless communications system 200, or both, as described with reference to FIGS. 1 and 2. For example, the wireless communications system 500 may include base station 505 and wireless nodes 515, which may be examples of base stations 105 and UEs 115, base station 205 and wireless nodes 215, or any other devices, as described herein. For example, wireless nodes 515 may be examples of UEs 115, wireless nodes 215, IAB nodes, repeater nodes, base stations 105 (e.g., gNBs), base station 205 (e.g., a gNB), or any combination thereof. The wireless communications system 500 may support improvements to interference, processing, power consumption, and more efficient utilization of communication resources, among other benefits.

To reduce CI and SI at wireless nodes 515, base station 505 may manage beam shapes of wireless nodes 515 by configuring a wireless node 515 that is causing the CI, SI, or both, with beam tapering configuration 510 (e.g., an allowable beam spatial response). In some examples, different beam tapering configurations may correspond to different tapering configurations with reference to FIG. 4. For example, base station 505 may configure wireless node 515-a with beam tapering configuration 510 with a configuration similar to tapering configuration 415 (e.g., rather than tapering configuration 405) to reduce sidelobe power and dB levels (e.g., which may result in a more pencil-like beam) and to reduce CI (e.g., at wireless node 515-b), SI, or both. Base station 505 may transmit beam tapering configuration 510 based on one or more factors.

In some examples, base station 505 may analyze the network and may receive interference reports (e.g., interference report 520) from one or more wireless nodes 515, such as wireless node 515-b. The base station may correlate channel measurement resource (CMR), interference measurement report (IMR), or both to channel state information (CSI) feedback (CSF) based reports from different wireless nodes (e.g., different UEs) to the actual mutual transmission and reception of all nodes within the network. Such reports, which may indicate CI caused by wireless node 515-*a* at wireless node 515-*b*, SI caused by wireless node 515-*a*, or both. The network (e.g., base station 505) may thus identify which wireless nodes 515 are generating CI to others (or SI to themselves), and may manage the sidelobes of each wireless node 515 (e.g., with a relatively small power penalty), by managing beam tapering at the various wireless nodes 515, Base station 505 may transmit beam tapering configuration 510 to wireless node 515-*a* due to or based on receiving the interference report 520. In some other examples, base station 505 may predict or measure CI between wireless nodes 515.

In some examples, the base station 505 may transmit the beam tapering configuration 510 (e.g., which may be a command, instruction, configuration, or the like) using RRC signaling, a MAC-CE, a DCI message, an F1 application protocol (F1-AP) indication (e.g., for a central unit (CU) to distributed unit (DU) indication), or any combination thereof.

In some examples, base station 505 may determine beam tapering configuration 510 (e.g., sidelobe strength, beamwidth, a beam shape, a set of parameter for generating a beam shape, a value for beam tapering, a pattern of beam shapes or beam tapering parameter values for use over a time window or a set of slots, or the like) for wireless node 515-*a* based on a semi-static environment. In some examples, the beam tapering configuration 510 may be zone-dependent (e.g., based on a geography, a maximum allowable velocity in cases where one or more wireless nodes 515 may be V2X nodes). For instance, EIRP may be more relevant in a geographic location with less traffic (e.g., a desert) and CI may be less of an issue. Therefore, a SINC-wise window may be applied (e.g., a beam tapering configuration with higher EIRP and higher power for one or more sidelobes). EIRP may be less important than managing CI in other locations (e.g., a city). Therefore, a base station 505 may statically or dynamically request a significantly more severe window (e.g., reducing sidelobe power despite a decrease in EIRP).

In some examples, the beam tapering configuration 510 may include one or more mobility metrics, or associations between one or more conditions and specific beam shapes or tapering configurations. For example, in a desert, base station 505 may transmit beam tapering configuration 510 to wireless node 515-*a*, indicating a tapering configuration with a high EIRP, regardless of a relatively higher power for one or more sidelobes (e.g., a beam tapering configuration similar to or the same as tapering configuration 405), as there may be relatively few wireless devices in the desert compared to other geographies (e.g., a city). Thus, increasing EIRP values for a transmission may be desirable in the desert compared to reducing CI (e.g., and thus a SINC-wise window may be applied). In some other examples, in a geographic location with higher population density or a higher number of wireless devices (e.g., a city), base station 505 may transmit beam tapering configuration 510 indicating a tapering configuration with lower power for one or more sidelobes (e.g., a beam tapering configuration similar to or the same as tapering configuration 410 or tapering configuration 415), as there may be a relatively large number of wireless devices causing CI or experiencing SI in the city compared to other geographies (e.g., a desert). Thus, decreasing sidelobe power for a transmission may be desirable in the city to reduce CI, SI, or both (e.g., and thus base station 505 may be able to statically request a more severe window).

In some examples, base station 505 may indicate or configure an allowable beam spatial response (e.g., a beam tapering configuration or beam shape in terms of side-lobe strength, beamwidth, etc.) to be zone-dependent (e.g., where the zone may be defined based on a geographical location, maximum allowed speed, or the like). For example, base station 505 may include, in the beam tapering configuration 510, an indication of a relationship between one or more beam shapes and different geographies, maximum allowable velocity, or other mobility metrics For instance, a first beam shape (e.g., with high EIRP and correspondingly higher sidelobe power) may be associated with some geographical areas or zones (e.g., deserts), and a second beam shape (e.g., with lower sidelobe power and correspondingly lower EIRP) may be associated with other geographical areas or zones (e.g., cities). In such examples, the wireless node 515-*a* may determine its geographical zone, and may select the beam shape (e.g., beam tapering) that is associated with that geographical zone. In some examples (e.g., in the context of mobile nodes such as V2X devices), the beam tapering configuration 510 may indicate a relationship between different speed limits and different beam shapes. The wireless node 515-*a* may thus select an appropriate or allowed beam shape (e.g., beam tapering configuration) based on a current speed limit, or other mobility parameter, as indicated in the beam tapering configuration 510. In some examples, a wireless node 515-*a* may transmit a report indicating its geographic location, or its current speed, or the like, and the base station 505 may select an appropriate beam shape based on the report. In such examples, the beam tapering configuration 510 may indicate a specific beam shape (e.g., a set of parameters for performing beam tapering, a beam index, or the like) based on the geographic location or other mobility parameter reported by the wireless node 515.

In some examples, an allowable beam shape (e.g., beam tapering configuration) may be based on a type or class of node. Base station 505 may determine beam tapering configuration 510 for the wireless node 515-*a* based on a type of one or more wireless nodes 515, such as wireless node 515-*a*. For example, base station 505 may determine to transmit different beam tapering configurations 510 if wireless nodes 515 are UEs, IABs, repeaters, base stations, or another wireless device. In some examples, different beam shapes (e.g., allowable beam spatial responses) may be configured in one or more standards documents. In some examples, the base station 105, the base station 505 may include, in beam tapering configuration 510, an association between a set of beam shapes (e.g., beam tapering configurations) and respective wireless node 515 types. For instance, a first beam shape (e.g., with high EIRP and correspondingly higher sidelobe power) may be associated with some wireless node 515 types, and a second beam shape (e.g., with lower sidelobe power and correspondingly lower EIRP) may be associated with other wireless node 515 types. In such examples, the wireless node 515-*a* may determine its type, and may select the beam shape (e.g., beam tapering) that is associated with that type.

In some examples, an allowable beam shape (e.g., beam tapering configuration) may be resource-dependent. Base station 505 may determine beam tapering configuration 510 based on a resource type for communications using beamformed beams according to beam tapering configuration 510, and may indicate the determined beam tapering configuration 510 to the wireless node 515-*a* based thereon. Such communications may be between any of wireless nodes 515 (e.g., a transmission by wireless node 515-*a*), base station 505, or any combination thereof. Base station 505 may determine different beam tapering configurations 510 based on if the resource type for such communications is an uplink resource type, a downlink resource type, a flexible resource type, or the like. In some examples, (e.g., when one or more wireless nodes 515 are IAB nodes), the resource type may be a soft resource type, a not-available resource type, or any combination thereof. Base station 505 may include an indication of an association between different beam shapes and resource types in the beam tapering configuration 510. For instance, the base station 505 may include, in beam tapering configuration 510, an association between a set of beam shapes (e.g., beam tapering configurations) and respective resource types. In such cases, a first beam shape (e.g., with high EIRP and correspondingly higher sidelobe power) may be associated with some resource types, and a second beam shape (e.g., with lower sidelobe power and correspondingly lower EIRP) may be associated with other resource types. In such examples, the wireless node 515-a may determine a resource type (e.g., for a transmission), and may select the beam shape (e.g., beam tapering) that is associated with that resource type.

In some examples, an allowable beam shape (e.g., beam tapering configuration) may be resource dependent based on a pattern. Base station 505 may include a bit map in transmitted beam tapering configuration 510 defining a transmission pattern (e.g., a periodic pattern) for a number of transmission time intervals (TTIs) (e.g., slots, mini-slots, frames, subframes, symbols, or the like). The bit map may indicate that wireless node 515-a is to transmit one or more beamformed message 525 according to various beam tapering configurations during various slots over time. For example, the bit map may indicate to transmit using a first beam shape for a first number of one or more slots, and a second beam shape for a second number of slots after the first number of slots. Wireless node 515-a may select different beam shapes for transmissions in different TTIs, and may transmit one or more beamformed message 525 during the different times using the respective selected beam shapes according to the bit map.

In some examples, an allowable beam shape (e.g., beam tapering configuration) may be dependent on a mode of operation. Base station 505 may determine beam tapering configuration 510 for the wireless node 515 based on a mode of operation (e.g., the mode of operation may be associated with communications by a receiving wireless node 515, such as wireless node 515-a, with communications by base station 505, or with any other device or any combination thereof). For example, base station 505 may determine beam tapering configuration 510 based on if such devices may be operating according to a half-duplexing mode, an FD mode, an enhanced duplexing mode (e.g., for wireless nodes 515 that may be IAB nodes), a spatial division multiplexing (SDM) mode (e.g., SDM-Tx, SDM-Rx), any other mode, or any combination thereof. Base station 505 may include an indication of the mode of operation in beam tapering configuration 510, which may indicate an association between the transmitted beam tapering configuration 510 and the mode of operation. That is, the base station 505 may include, in beam tapering configuration 510, an association between a set of beam shapes (e.g., beam tapering configurations) and respective modes of operation. For instance, a first beam shape (e.g., with high EIRP and correspondingly higher sidelobe power) may be associated with some modes of operation, and a second beam shape (e.g., with lower sidelobe power and correspondingly lower EIRP) may be associated with other modes of operation. In such examples, the wireless node 515-a may determine its mode of operation, and may select the beam shape (e.g., beam tapering) that is associated with that mode of operation. In some examples, the base station may configure the wireless node 515-a to operate with a particular mode of operation, or may otherwise determine the mode of operation, and may explicitly indicate the corresponding allowed beam shape in the beam tapering configuration 510.

In some examples, an allowable beam shape (e.g., beam tapering configuration) may be dependent on channel or traffic type. Base station 505 may determine beam tapering configuration 510 based on a channel type, a traffic type, a real time network load (e.g., a traffic load), or any combination thereof, for communications between wireless devices (e.g., wireless nodes 515), base station 505, or any combination thereof. Such channel types or traffic types may include control channels or control signaling, data channels or traffic, enhanced mobile broadband (eMBB) channels or traffic, ultra-reliable low-latency communication (URLLC) channels or traffic, any other channel types or traffic types, or any combination thereof. Base station 505 may include, in beam tapering configuration 510, an indication of an association between the transmitted beam tapering configuration 510 and the channel type, traffic type, or both. For example, the base station 505 may include, in beam tapering configuration 510, an association between a set of beam shapes (e.g., beam tapering configurations) and respective channel or traffic types. For instance, a first beam shape (e.g., with high EIRP and correspondingly higher sidelobe power) may be associated with some channel or traffic types, and a second beam shape (e.g., with lower sidelobe power and correspondingly lower EIRP) may be associated with other channel or traffic types. In such examples, the wireless node 515-a may determine a channel or traffic type (e.g., for a transmission), and may select the beam shape (e.g., beam tapering configuration) that is associated with that channel or traffic type. In some examples, the base station 505 may configure the wireless node 515-a to communicate via a particular channel type, or may otherwise identify pending traffic of a particular traffic type, and may explicitly indicate the corresponding allowed beam shape in the beam tapering configuration 510.

In some examples, base station 505 may include one or more beam tapering parameters (e.g., $\xi$), one or more beam tapering functions (e.g., Equation 1), an indication of a beam shape, a beam identifier, an indication to adjust (e.g., in power, dB, sidelobe strength, or the like) a spatial response (e.g., beamformed message 525) at one or more angles (e.g., in degrees, radians), or any combination thereof, in beam tapering configuration 510. Wireless node 515-a may receive the beam tapering configuration 510 and may transmit beamformed message 525 according to such parameters, functions, beam shapes, identifiers, or combination thereof. For example, wireless node 515-a may transmit beamformed message 525 according to tapering configuration 405, tapering configuration 410, tapering configuration 415, or the like, as described with reference to FIG. 4.

In some examples, base station 505 may include, in beam tapering configuration 510, a recommendation indication or a request for wireless node 515-a to reduce or increase sidelobe dB levels by a value. In some examples, the recommendation indication or request may be separate from beam tapering configuration 510.

In some examples, base station 505 may transmit beam tapering configuration 510 (e.g., which may be a command, instruction, configuration, or the like) using RRC signaling, a MAC-CE, a DCI message, an F1 application protocol (F1-AP) indication (e.g., for a central unit (CU) to distributed unit (DU) indication), or any combination thereof. Base station 505 may transmit beam tapering configuration 510 to dictate, recommend, request, or any combination thereof, wireless node 515-a to transmit beamformed message 525 according to the beam tapering configuration 510.

In some examples, wireless nodes 515, such as wireless node 515-a (e.g., a UE, a repeater node), may transmit capability information 530 to base station 505 or a control entity. Capability information 530 may indicate how many different tapering configurations (e.g., beam shapes) wireless node 515-a can support, what tapering scheme (e.g., Hamming with different $\xi$ parameter values) wireless node 515-a can support, one or more beam tapering functions (e.g., Equation 1), one or more beam shapes (e.g., tapering configuration 405, tapering configuration 410, tapering configuration 415, or the like, as described with reference to FIG. 4), one or more beam identifiers (e.g., beam IDs indicating particular beams or beam shapes of a set of beam IDs or beam shapes), any other limitations on the PA changes that the wireless node can support. In some examples, the capability information 530 may indicate one or more potential adjustments (e.g., a range or set of values in power, sidelobe strength, or the like, that the wireless node 515-a is capable of applying to a current beam shape to adjust the beam according to the beam tapering configuration) or the like.

Base station 505 may receive capability information 530, and may determine a beam tapering parameter, a beam tapering function, a beam shape, a beam identifier, or any combination thereof from capability information 530. Base station 505 may indicate the determined information to wireless node 515-a in beam tapering configuration 510 (e.g., in response to the capability information 530). Base station 505 may determine such information for beam tapering configuration 510 based on capability information 530, and additionally or alternatively based on any one or more of the factors as described herein (e.g., semi-static or zone-dependent parameters, node types, resource types, modes of operation, channel types, a traffic types, interference reports (e.g., interference report 520), or any combination thereof). Wireless node 515-a may transmit beamformed message 525 according to the beam tapering configuration 510 (e.g., according to the determined information including the determined beam tapering parameter, beam tapering function, beam shape, beam identifier, transmission pattern, adjustment, or the like).

In some examples, base station 505 or a control entity may instruct wireless node 515-a to transmit or measure one or more signals based on various beam tapering configurations. For example, base station 505 may transmit instructions 535 to wireless node 515-a for wireless node 515-a to transmit signals 540 (e.g., using different beams or beam tapering configurations) to base station 505, each signal transmitted according to a different beam tapering configuration. Based on measurements performed on the signals, the base station 505 may determine and indicate (e.g., in beam tapering configuration 510) a proper beam (e.g., tapering configuration) to be used for the upcoming communications (e.g., beamformed message 525). In some examples, the network may be provided with the supportable tapering configurations of the wireless node 515-a (e.g., via capability information 530). In such examples, the base station 505 may explicitly indicate what choice of parameter is to be adopted (e.g., in beam tapering configuration 510) for generating a beam on which to transmit beamformed message 525.

In some cases, the network may not have access to information regarding how the different beams are created, or their exact spatial response. Instead, the base station 505 may indicate a set of beams for transmitting signals 540, on which the base station 505 may perform one or more measurements. The base station 505 may also indicate, to the wireless node 515-a, a quasi co-location (QCL) relationship (e.g., a spatial QCL relationship) between each different beam of the set of beams (e.g., each of the different beam tapering configurations may have a same primary lobe direction, but different sidelobe directions, and thus the different beams may be approximately (e.g., roughly) QCLed with each other). In this way, base station 505 may not identify or rely on any information related to how wireless node 515-a generates each of the signals 540 or each spatial response of each signal 540. Base station 505 may measure signals 540 transmitted using the different beams (e.g., having the different sidelobe directions and powers, etc.) and may determine which signal 540 is was transmitted on a preferred beam (e.g., a proper beam tapering configuration) for future communications (e.g., by wireless node 515-a). The base station 505 may transmit beam tapering configuration 510 indicating the preferred beam tapering configuration for wireless node 515-a to use for transmitting beamformed message 525 (e.g., may indicate which of the set of signals 540 had a preferred or highest measurement value).

Base station 505 may determine the proper beam tapering configuration in combination with any combination of factors as described herein (e.g., semi-static or zone-dependent parameters, node types, resource types, modes of operation, channel types, a traffic types, interference reports (e.g., interference report 520), capability information 530, or any combination thereof). Wireless node 515-a may transmit beamformed message 525 according to the received beam tapering configuration 510.

Figure 6:
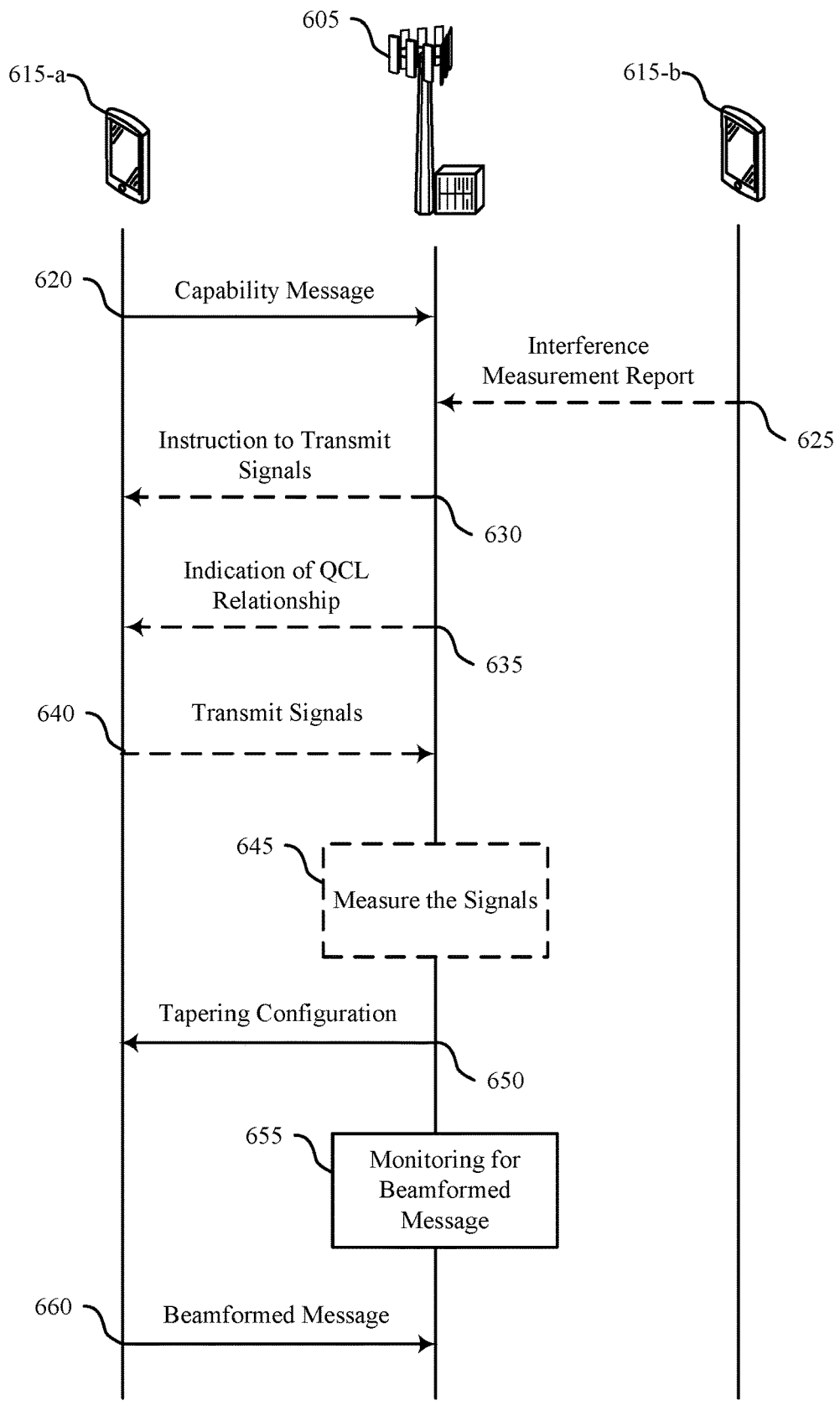
FIG. 6 illustrates an example of a process flow that supports closed loop spatial interference control in full duplex in accordance with aspects of the present disclosure.

FIG. 6 illustrates an example of a process flow 600 that supports techniques for closed loop spatial interference control in FD in accordance with aspects of the present disclosure. The process flow 600 may implement or be implemented by aspects of the wireless communications system 100, wireless communications system 200, wireless communications system 500, or a combination of these, as described with reference to FIGS. 1, 2 and 5. In some examples, the process flow 600 may include example operations associated with one or more wireless nodes 615 and base station 605, which may be examples of corresponding devices described with reference to FIGS. 1, 2, and 5. In the following description of the process flow 600, the operations between the wireless nodes 615 and base station 605 may be performed in a different order than the example order shown, or the operations performed by the wireless nodes 615 and base station 605 may be performed in different orders or at different times. Some operations may also be omitted from the process flow 600, and other operations may be added to the process flow 600. In some examples, one or more wireless nodes 615 may be or include a UE, an IAB node, a repeater node, other base stations 605, or any combination thereof.

At 620, wireless node 615-a may transmit, to base station 605, a capability message indicating that the wireless node 615-a supports a plurality of beam tapering configurations. In some examples, wireless node 615-a may transmit the capability message including a set of supported beam tapering parameters (e.g., a set of supported beam tapering functions (e.g., Equation 1), a set of supported beam shapes, a set of supported beam identifiers, or any combination thereof.

At 625, base station 605 may receive, from one or more wireless nodes (e.g., wireless node 615-b), an interference measurement report including an indication of interference caused by wireless node 615-a, the wireless node 615-b, or any combination thereof.

At 650, wireless node 615-a may receive, from base station 605, an indication of a first beam tapering configuration of the plurality of beam tapering configurations on the capability message. In some examples, base station 605 may transmit the indication of the first beam tapering configuration of the plurality of beam tapering configurations based on receiving the interference measurement report. For example, based on one or more interference measurement reports, the base station 605 may determine that CI caused by aggressor node 615-a and experienced by victim node 615-b may be decreased if the wireless node 615-a uses a different beam shape (e.g., according to a different beam tapering configuration). In such examples, the base station 605 may indicate the beam tapering configuration to the wireless node 615-a in the beam tapering configuration at 650.

In some examples, wireless node 615-a may receive the indication of the first beam tapering configuration including a set of beam tapering parameters, a set of beam tapering functions, an indication of a beam shape, a beam identifier, or any combination thereof. In some examples, wireless node 615-a may receive the indication of the first beam tapering configuration including a bit map defining a transmission pattern for utilizing one or more beam tapering configurations of the plurality of beam tapering configurations over multiple time slots. In some examples, wireless node 615-a may receive the indication of the first beam tapering configuration including an indication that the first beam tapering configuration is associated with a resource type, where the resource type includes an uplink resource type, a downlink resource type, a flexible resource type, a hard resource type, a soft resource type, a not-available resource type, or any combination thereof.

In some examples, wireless node 615-a may receive the indication of the first beam tapering configuration including an indication that the first beam tapering configuration is associated with a mode of operation, where the mode of operation includes a half-duplexing mode, a full-duplexing mode, an enhanced duplexing mode, a spatial division multiplexing mode, or any combination thereof. In some examples, wireless node 615-a may receive the indication of the first beam tapering configuration including an indication that the first beam tapering configuration is associated with a traffic type or a channel type. In some examples, wireless node 615-a may receive the indication of the first beam tapering configuration including an indication that the first beam tapering configuration is associated with a geographic location, a permitted velocity, one or more mobility parameters, or any combination thereof. In some examples, wireless node 615-a may receive the indication of the first beam tapering configuration via RRC signaling, a DCI message, a MAC-CE, or any combination thereof.

In some examples, wireless node 615-a may receive the indication of the first beam tapering configuration based on transmitting the one or more signals to the base station 605. For instance, at t 635, wireless node 615-a may receive, from base station 605, an instruction to transmit one or more signals according to one or more of the multiple beam tapering configurations. In some cases, at 630, wireless node 615-a may receive, from base station 605, an indication of a QCL relationship between the one or more of the multiple beam tapering configurations, and receiving the instruction may be based on receiving the indication of the QCL relationship. At 640, wireless node 615-a may transmit, to base station 605, the one or more signals according to the one or more of the multiple beam tapering configurations (e.g., which may be roughly or approximately QCLed with each other, as indicated at 630). The one or more beam tapering configurations may have primary nodes pointed toward the base station 605, and different powers or directions of sidelobes. At 645, base station 605 may perform one or more measurements on each of the one or more signals. In such examples, base station 605 may transmit the beam tapering configuration at 650 based at least in part on having received the signals at 640, and having performed such measurements at 645.

At 655, base station 605 may monitor for a message that is beamformed according to the first beam tapering configuration.

At 660, wireless node 615-a may transmit, and the base station 605 may receive based on the monitoring, a message that is beamformed according to the first beam tapering configuration.

Figure 7:
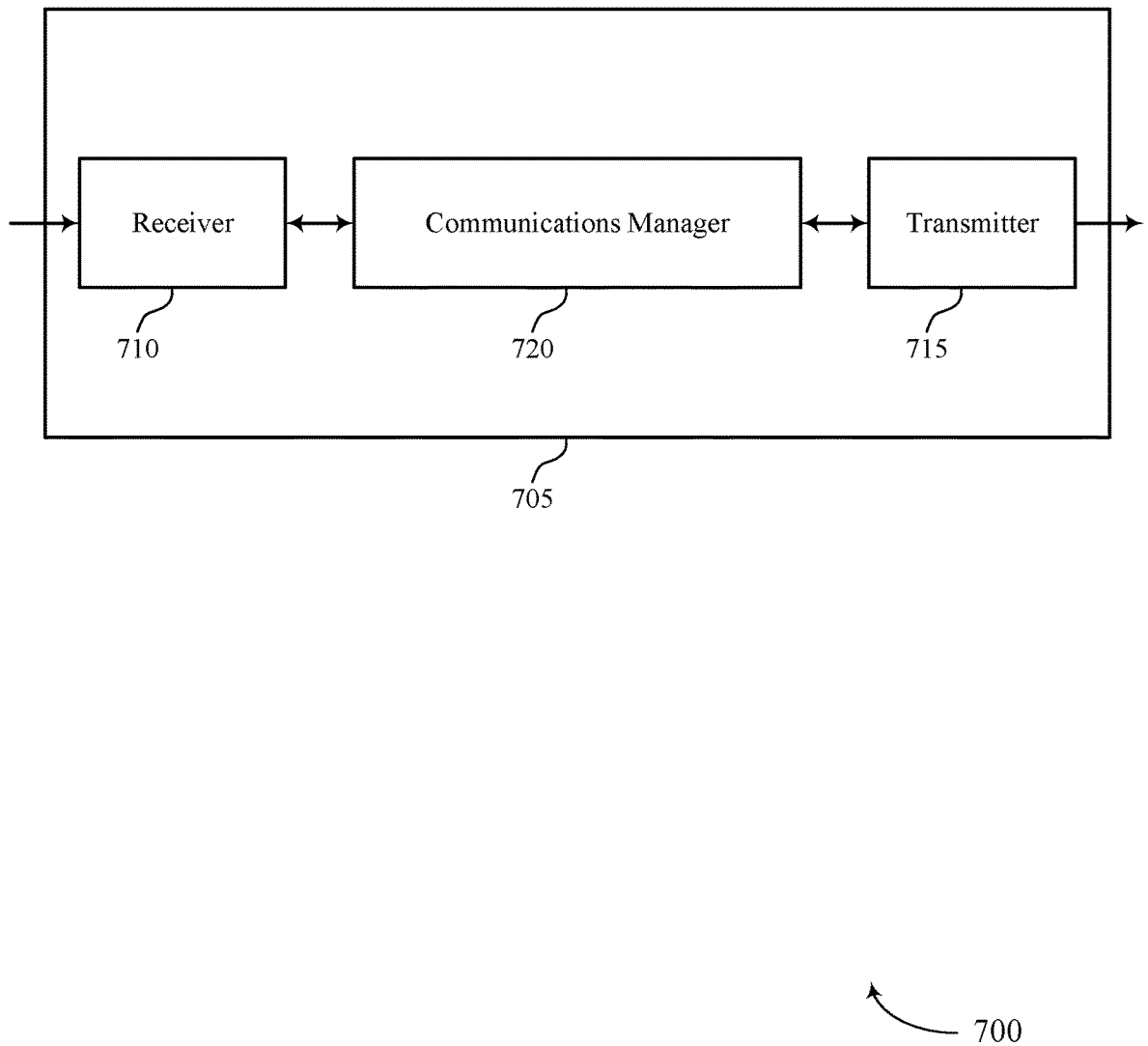
FIGS. 7 and 8 show block diagrams of devices that support closed loop spatial interference control in full duplex in accordance with aspects of the present disclosure.

FIG. 7 shows a block diagram 700 of a device 705 that supports closed loop spatial interference control in full duplex in accordance with aspects of the present disclosure. The device 705 may be an example of aspects of a wireless node as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to closed loop spatial interference control in full duplex). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to closed loop spatial interference control in full duplex). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of closed loop spatial interference control in full duplex as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a wireless node in accordance with examples as disclosed herein. For example, the communications manager 720 may be configured as or otherwise support a means for transmitting, to a base station, a capability message indicating that the wireless node supports a set of multiple beam tapering configurations. The communications manager 720 may be configured as or otherwise support a means for receiving, from the base station, an indication of a beam tapering configuration of the set of multiple beam tapering configurations based on the capability message. The communications manager 720 may be configured as or otherwise support a means for transmitting a message that is beamformed according to the beam tapering configuration.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced processing, reduced power consumption, and more efficient utilization of communication resources.

Figure 8:
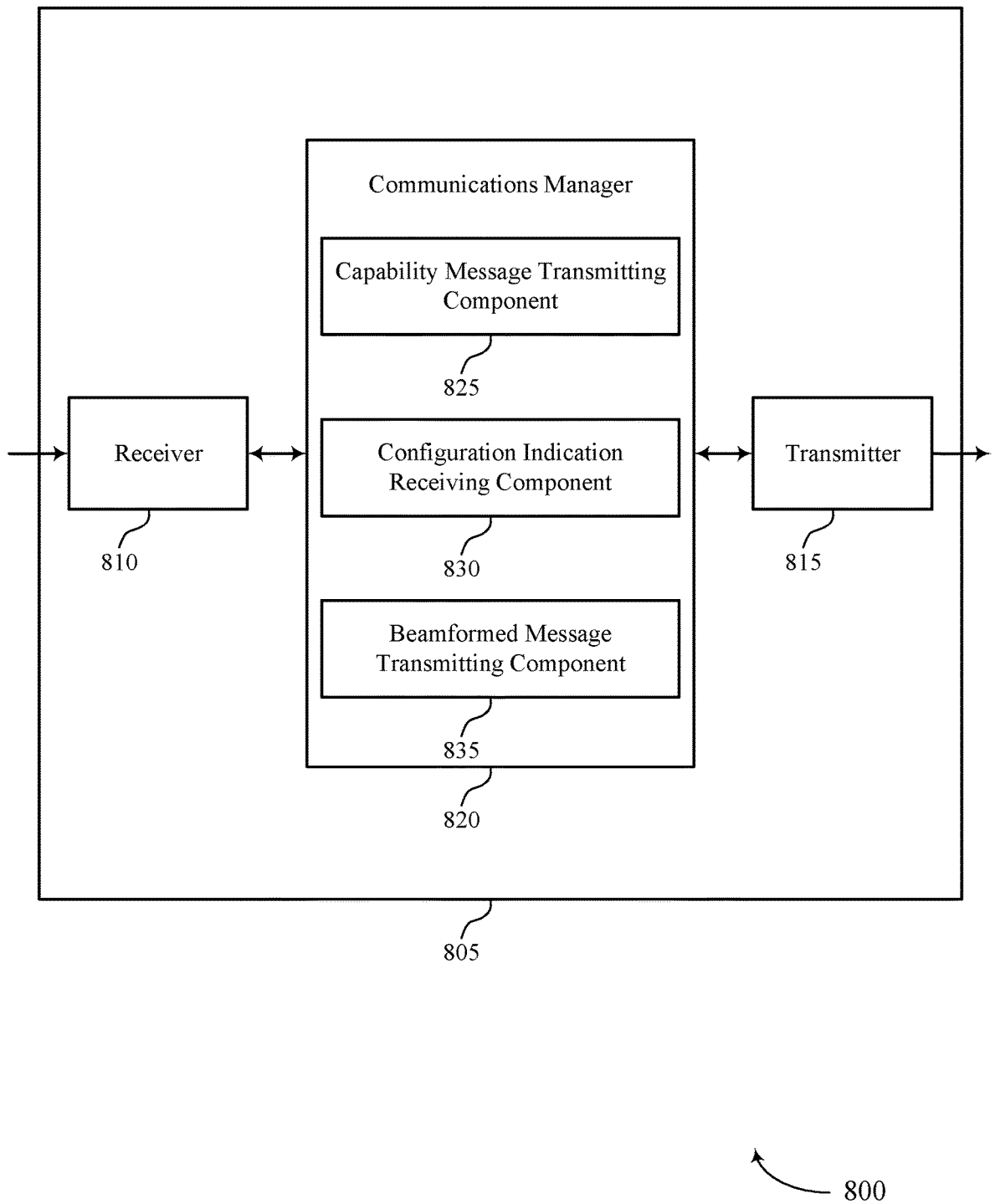

FIG. 8 shows a block diagram 800 of a device 805 that supports closed loop spatial interference control in full duplex in accordance with aspects of the present disclosure. The device 805 may be an example of aspects of a device 705 or a wireless node (e.g., such as a UE 115) as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to closed loop spatial interference control in full duplex). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to closed loop spatial interference control in full duplex). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of closed loop spatial interference control in full duplex as described herein. For example, the communications manager 820 may include a capability message transmitting component 825, a configuration indication receiving component 830, a beamformed message transmitting component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a wireless node in accordance with examples as disclosed herein. The capability message transmitting component 825 may be configured as or otherwise support a means for transmitting, to a base station, a capability message indicating that the wireless node supports a set of multiple beam tapering configurations. The configuration indication receiving component 830 may be configured as or otherwise support a means for receiving, from the base station, an indication of a beam tapering configuration of the set of multiple beam tapering configurations based on the capability message. The beamformed message transmitting component 835 may be configured as or otherwise support a means for transmitting a message that is beamformed according to the beam tapering configuration.

Figure 9:
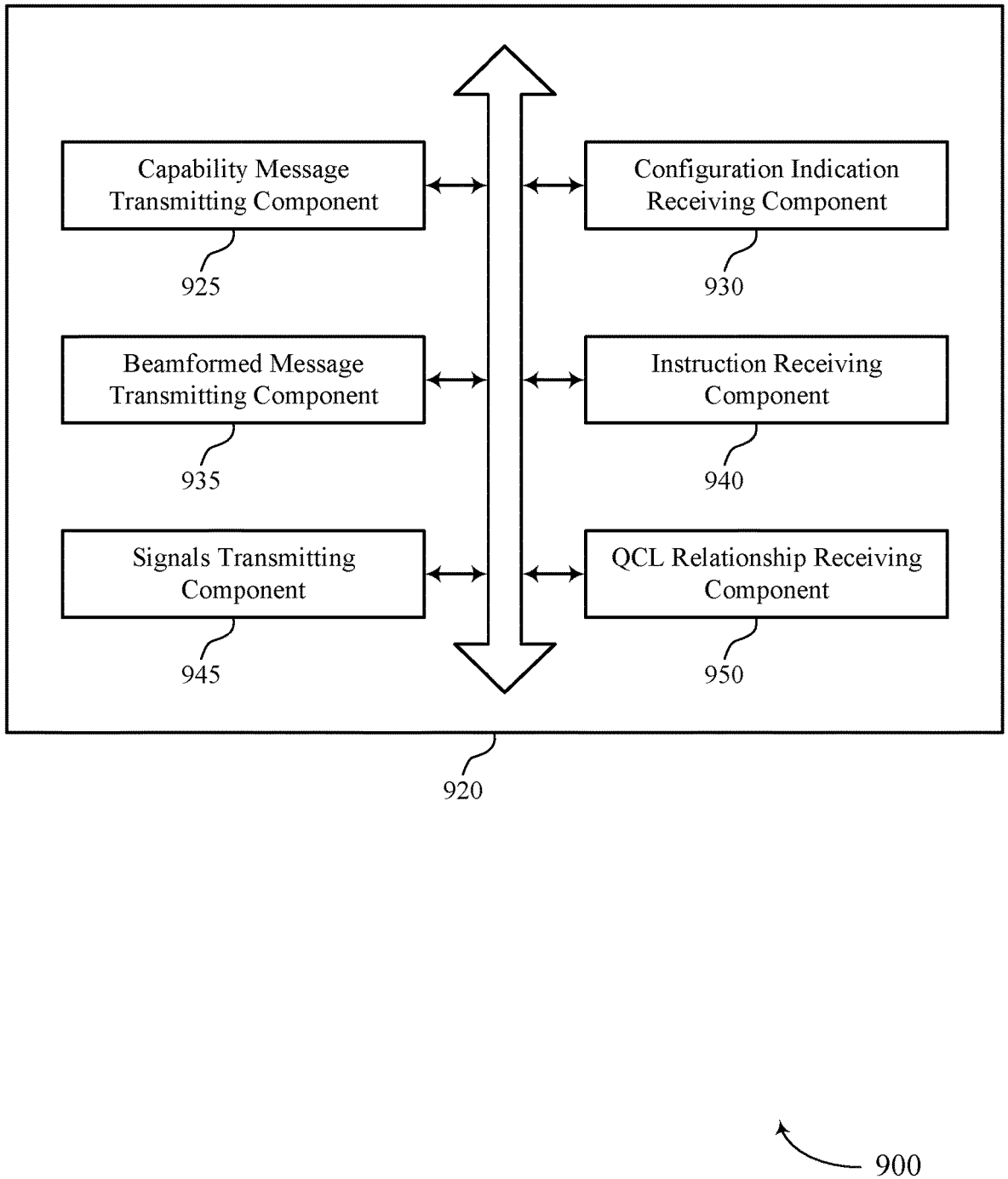
FIG. 9 shows a block diagram of a communications manager that supports closed loop spatial interference control in full duplex in accordance with aspects of the present disclosure.

FIG. 9 shows a block diagram 900 of a communications manager 920 that supports closed loop spatial interference control in full duplex in accordance with aspects of the present disclosure. The communications manager 920 may be an example of aspects of a communications manager 720, a communications manager 820, or both, as described herein. The communications manager 920, or various components thereof, may be an example of means for performing various aspects of closed loop spatial interference control in full duplex as described herein. For example, the communications manager 920 may include a capability message transmitting component 925, a configuration indication receiving component 930, a beamformed message transmitting component 935, an instruction receiving component 940, a signals transmitting component 945, a QCL relationship receiving component 950, or any combination thereof. Each of these components may communicate, directly or indirectly, with one another (e.g., via one or more buses).

The communications manager 920 may support wireless communications at a wireless node in accordance with examples as disclosed herein. The capability message transmitting component 925 may be configured as or otherwise support a means for transmitting, to a base station, a capability message indicating that the wireless node supports a set of multiple beam tapering configurations. The configuration indication receiving component 930 may be configured as or otherwise support a means for receiving, from the base station, an indication of a beam tapering configuration of the set of multiple beam tapering configurations based on the capability message. The beamformed message transmitting component 935 may be configured as or otherwise support a means for transmitting a message that is beamformed according to the beam tapering configuration.

In some examples, to support receiving the indication of the beam tapering configuration, the configuration indication receiving component 930 may be configured as or otherwise support a means for receiving the indication of the beam tapering configuration including a set of beam tapering parameters, a set of beam tapering functions, an indication of a beam shape, a beam identifier, or any combination thereof.

In some examples, to support receiving the indication of the beam tapering configuration, the configuration indication receiving component 930 may be configured as or otherwise support a means for receiving the indication of the beam tapering configuration including a bit map defining a transmission pattern for utilizing one or more beam tapering configurations of the set of multiple beam tapering configurations over a set of multiple time slots.

In some examples, to support receiving the indication of the beam tapering configuration, the configuration indication receiving component 930 may be configured as or otherwise support a means for receiving the indication of the beam tapering configuration including an indication that the beam tapering configuration is associated with a resource type.

In some examples, to support receiving the indication of the beam tapering configuration, the configuration indication receiving component 930 may be configured as or otherwise support a means for receiving the indication of the beam tapering configuration including an indication that the beam tapering configuration is associated with a mode of operation, where the mode of operation includes a half-duplexing mode, an FD mode, an enhanced duplexing mode, a spatial division multiplexing mode, or any combination thereof.

In some examples, to support receiving the indication of the beam tapering configuration, the configuration indication receiving component 930 may be configured as or otherwise support a means for receiving the indication of the beam tapering configuration including an indication that the beam tapering configuration is associated with a traffic type or a channel type.

In some examples, to support receiving the indication of the beam tapering configuration, the configuration indication receiving component 930 may be configured as or otherwise support a means for receiving the indication of the beam tapering configuration including an indication that the beam tapering configuration is associated with a geographic location, a permitted velocity, one or more mobility parameters, or any combination thereof.

In some examples, to support transmitting the capability message, the capability message transmitting component 925 may be configured as or otherwise support a means for transmitting the capability message including a set of supported beam tapering parameters, a set of supported beam tapering functions, a set of supported beam shapes, a set of supported beam identifiers, or any combination thereof.

In some examples, the instruction receiving component 940 may be configured as or otherwise support a means for receiving, from the base station, an instruction to transmit one or more signals according to one or more of the set of multiple beam tapering configurations. In some examples, the signals transmitting component 945 may be configured as or otherwise support a means for transmitting, to the base station, the one or more signals according to the one or more of the set of multiple beam tapering configurations, where receiving the indication of the beam tapering configuration is based on transmitting the one or more signals.

In some examples, the QCL relationship receiving component 950 may be configured as or otherwise support a means for receiving, from the base station, an indication of a QCL relationship between the one or more of the set of multiple beam tapering configurations, where receiving the instruction is based on receiving the indication of the QCL relationship.

In some examples, to support receiving the indication of the beam tapering configuration, the configuration indication receiving component 930 may be configured as or otherwise support a means for receiving RRC signaling, a DCI message, a MAC-CE, or any combination thereof.

In some examples, the wireless node includes a UE, an IAB node, a repeater node, a second base station, or any combination thereof.

Figure 10:
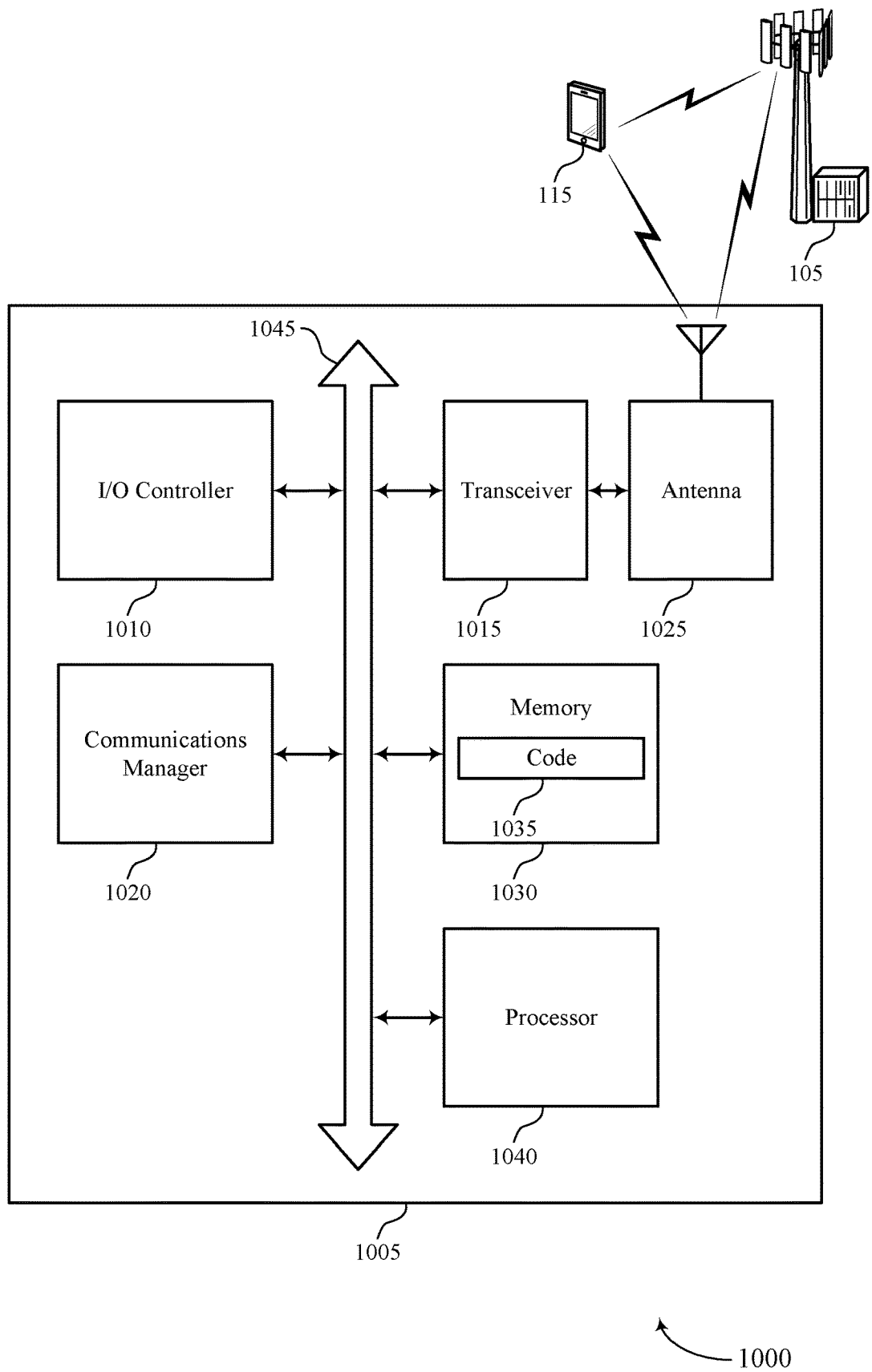
FIG. 10 shows a diagram of a system including a device that supports closed loop spatial interference control in full duplex in accordance with aspects of the present disclosure.

FIG. 10 shows a diagram of a system 1000 including a device 1005 that supports closed loop spatial interference control in full duplex in accordance with aspects of the present disclosure. The device 1005 may be an example of or include the components of a device 705, a device 805, or a wireless node as described herein. The device 1005 may include components for bi-directional voice and data communications including components for transmitting and receiving communications, such as a communications manager 1020, an I/O controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include RAM and ROM. The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a BIOS which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting closed loop spatial interference control in full duplex). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a wireless node in accordance with examples as disclosed herein. For example, the communications manager 1020 may be configured as or otherwise support a means for transmitting, to a base station, a capability message indicating that the wireless node supports a set of multiple beam tapering configurations. The communications manager 1020 may be configured as or otherwise support a means for receiving, from the base station, an indication of a beam tapering configuration of the set of multiple beam tapering configurations based on the capability message. The communications manager 1020 may be configured as or otherwise support a means for transmitting a message that is beamformed according to the beam tapering configuration.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of closed loop spatial interference control in full duplex as described herein, or the processor 1040 and the memory 1030 may be otherwise configured to perform or support such operations.

Figure 11:
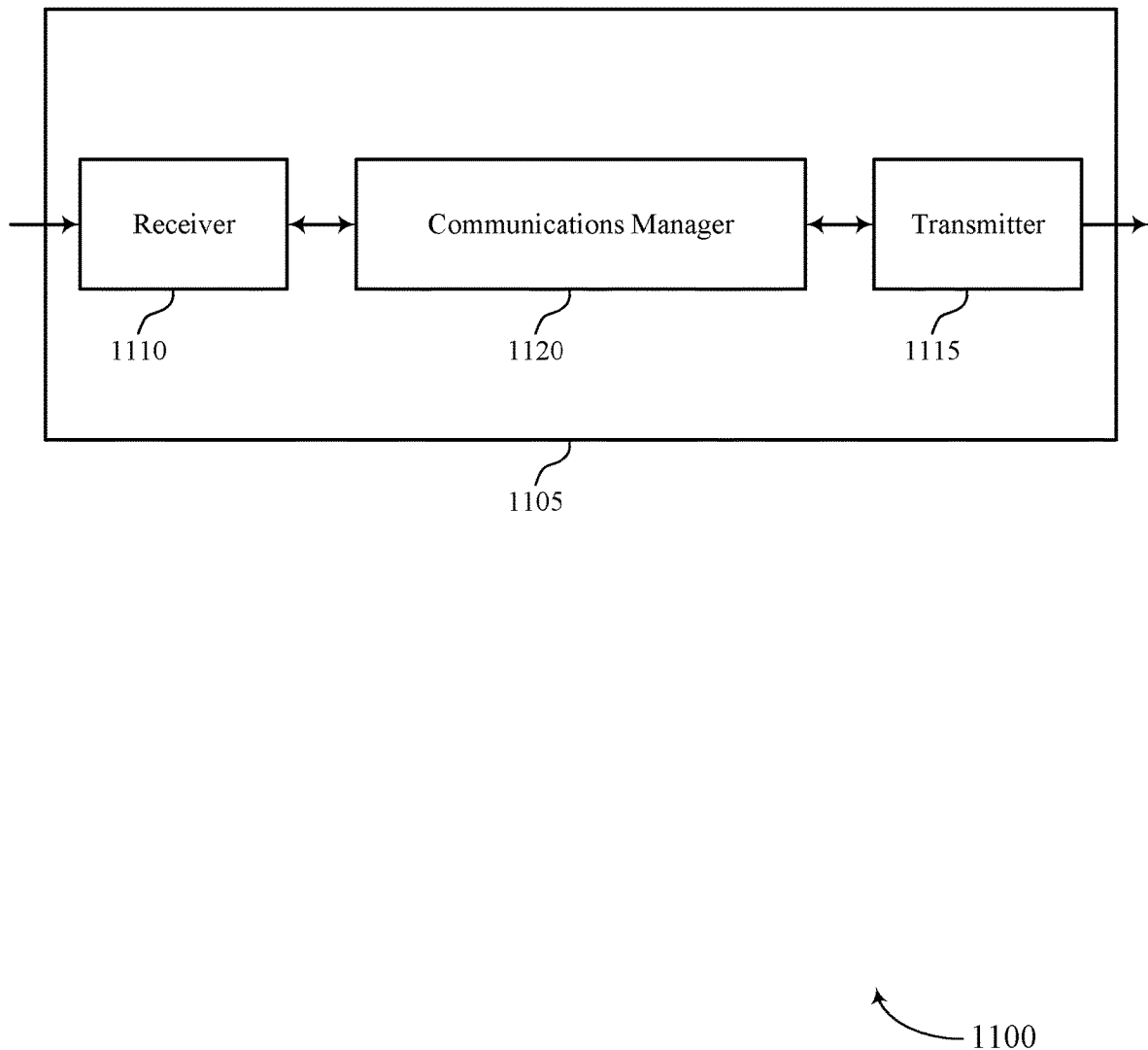
FIGS. 11 and 12 show block diagrams of devices that support closed loop spatial interference control in full duplex in accordance with aspects of the present disclosure.

FIG. 11 shows a block diagram 1100 of a device 1105 that supports closed loop spatial interference control in full duplex in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to closed loop spatial interference control in full duplex). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to closed loop spatial interference control in full duplex). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of closed loop spatial interference control in full duplex as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. For example, the communications manager 1120 may be configured as or otherwise support a means for receiving, from a first wireless node, a capability message indicating that the first wireless node supports a set of multiple beam tapering configurations. The communications manager 1120 may be configured as or otherwise support a means for transmitting, to the first wireless node, an indication of a beam tapering configuration of the set of multiple beam tapering configurations for the first wireless node based on an interference measurement. The communications manager 1120 may be configured as or otherwise support a means for monitoring for a message that is beamformed according to the beam tapering configuration.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced processing, reduced power consumption, and more efficient utilization of communication resources.

Figure 12:
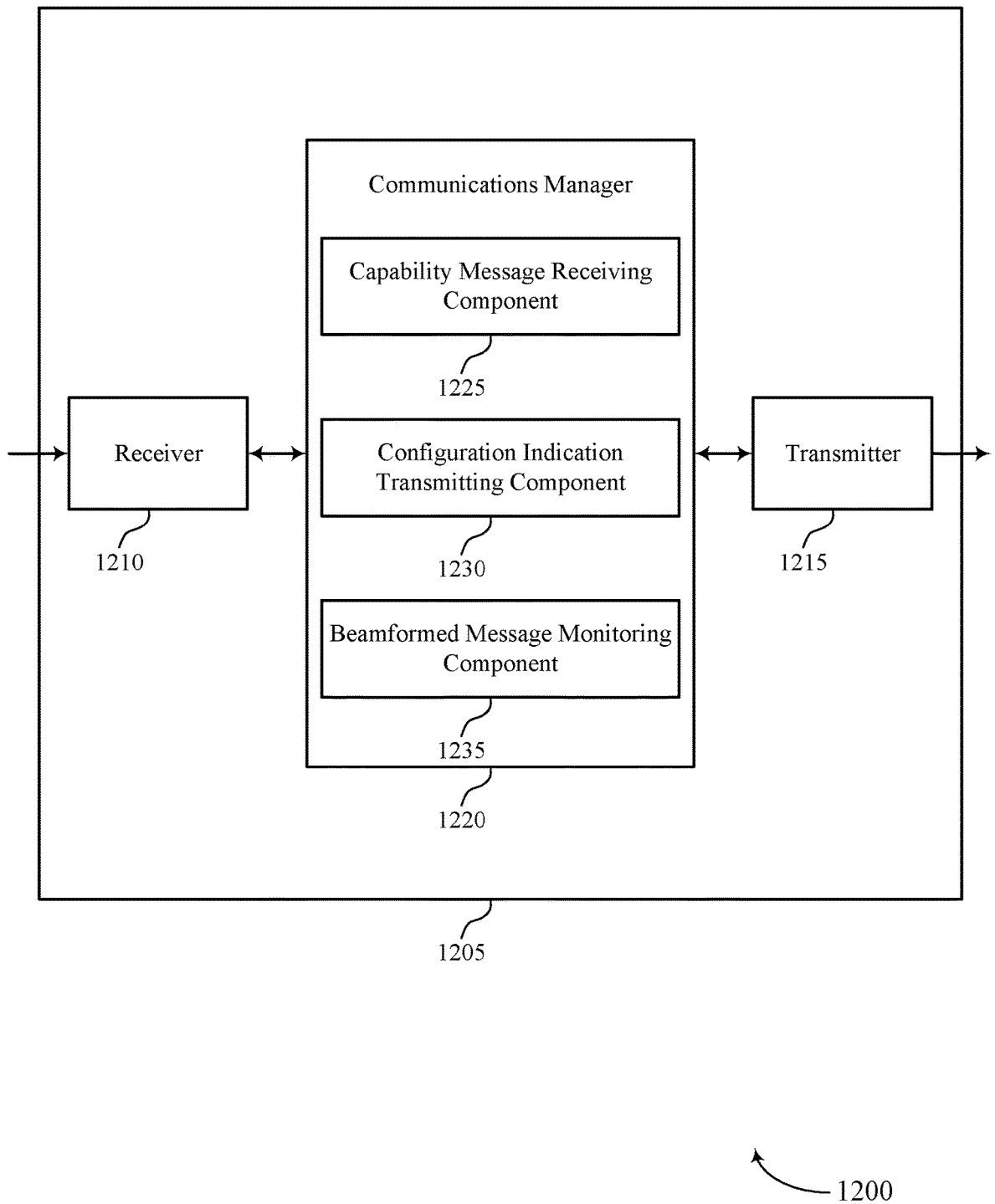

FIG. 12 shows a block diagram 1200 of a device 1205 that supports closed loop spatial interference control in full duplex in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to closed loop spatial interference control in full duplex). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to closed loop spatial interference control in full duplex). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of closed loop spatial interference control in full duplex as described herein. For example, the communications manager 1220 may include a capability message receiving component 1225, a configuration indication transmitting component 1230, a beamformed message monitoring component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. The capability message receiving component 1225 may be configured as or otherwise support a means for receiving, from a first wireless node, a capability message indicating that the first wireless node supports a set of multiple beam tapering configurations. The configuration indication transmitting component 1230 may be configured as or otherwise support a means for transmitting, to the first wireless node, an indication of a beam tapering configuration of the set of multiple beam tapering configurations for the first wireless node based on an interference measurement. The beamformed message monitoring component 1235 may be configured as or otherwise support a means for monitoring for a message that is beamformed according to the beam tapering configuration.

Figure 13:
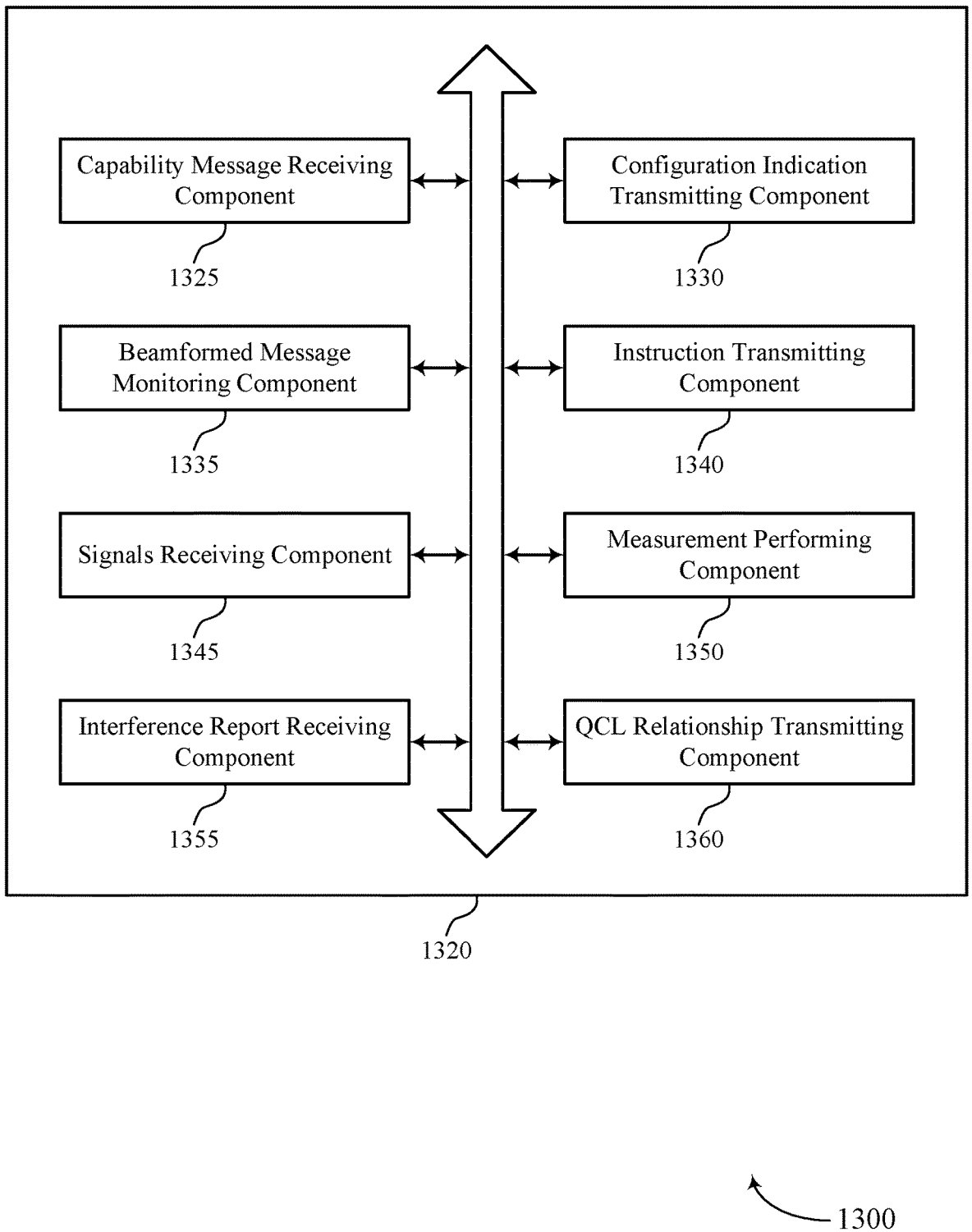
FIG. 13 shows a block diagram of a communications manager that supports closed loop spatial interference control in full duplex in accordance with aspects of the present disclosure.

FIG. 13 shows a block diagram 1300 of a communications manager 1320 that supports closed loop spatial interference control in full duplex in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of closed loop spatial interference control in full duplex as described herein. For example, the communications manager 1320 may include a capability message receiving component 1325, a configuration indication transmitting component 1330, a beamformed message monitoring component 1335, an instruction transmitting component 1340, a signals receiving component 1345, a measurement performing component 1350, an interference report receiving component 1355, a QCL relationship transmitting component 1360, or any combination thereof. Each of these components may communicate, directly or indirectly, with one another (e.g., via one or more buses).

The communications manager 1320 may support wireless communications at a base station in accordance with examples as disclosed herein. The capability message receiving component 1325 may be configured as or otherwise support a means for receiving, from a first wireless node, a capability message indicating that the first wireless node supports a set of multiple beam tapering configurations. The configuration indication transmitting component 1330 may be configured as or otherwise support a means for transmitting, to the first wireless node, an indication of a beam tapering configuration of the set of multiple beam tapering configurations for the first wireless node based on an interference measurement. The beamformed message monitoring component 1335 may be configured as or otherwise support a means for monitoring for a message that is beamformed according to the beam tapering configuration.

In some examples, to support transmitting the indication of the beam tapering configuration, the configuration indication transmitting component 1330 may be configured as or otherwise support a means for transmitting the indication of the beam tapering configuration including a set of beam tapering parameters, a set of beam tapering functions, an indication of a beam shape, a beam identifier, or any combination thereof.

In some examples, to support transmitting the indication of the beam tapering configuration, the configuration indication transmitting component 1330 may be configured as or otherwise support a means for transmitting the indication of the beam tapering configuration including a bit map defining a transmission pattern for utilizing one or more beam tapering configurations of the set of multiple beam tapering configurations over a set of multiple time slots.

In some examples, to support transmitting the indication of the beam tapering configuration, the configuration indication transmitting component 1330 may be configured as or otherwise support a means for transmitting the indication of the beam tapering configuration including an indication that the beam tapering configuration is associated with a resource type.

In some examples, to support transmitting the indication of the beam tapering configuration, the configuration indication transmitting component 1330 may be configured as or otherwise support a means for transmitting the indication of the beam tapering configuration including an indication that the beam tapering configuration is associated with a mode of operation, where the mode of operation includes a half-duplexing mode, an FD mode, an enhanced duplexing mode, a spatial division multiplexing mode, or any combination thereof.

In some examples, to support transmitting the indication of the beam tapering configuration, the configuration indication transmitting component 1330 may be configured as or otherwise support a means for transmitting the indication of the beam tapering configuration including an indication that the beam tapering configuration is associated with a traffic type or a channel type.

In some examples, to support transmitting the indication of the beam tapering configuration, the configuration indication transmitting component 1330 may be configured as or otherwise support a means for transmitting the indication of the beam tapering configuration including an indication that the beam tapering configuration is associated with a geographic location, a permitted velocity, one or more mobility parameters, or any combination thereof.

In some examples, to support receiving the capability message, the capability message receiving component 1325 may be configured as or otherwise support a means for receiving the capability message including a set of supported beam tapering parameters, a set of supported beam tapering functions, a set of supported beam shapes, a set of supported beam identifiers, or any combination thereof.

In some examples, the instruction transmitting component 1340 may be configured as or otherwise support a means for transmitting, to the first wireless node, an instruction to transmit one or more signals according to one or more of the set of multiple beam tapering configurations. In some examples, the signals receiving component 1345 may be configured as or otherwise support a means for receiving, from the first wireless node, the one or more signals according to the one or more of the set of multiple beam tapering configurations. In some examples, the measurement performing component 1350 may be configured as or otherwise support a means for performing one or more measurements on each of the one or more signals, where transmitting the indication of the beam tapering configuration is based on performing the one or more measurements.

In some examples, the QCL relationship transmitting component 1360 may be configured as or otherwise support a means for transmitting, to the first wireless node, an indication of a QCL relationship between the one or more of the set of multiple beam tapering configurations, where receiving the one or more signals is based on transmitting the indication of the QCL relationship.

In some examples, the interference report receiving component 1355 may be configured as or otherwise support a means for receiving, from a second wireless node, an interference measurement report including an indication of interference caused by the first wireless node, the second wireless node, or any combination thereof, where transmitting the indication of the beam tapering configuration of the set of multiple beam tapering configurations is based on receiving the interference measurement report.

In some examples, to support transmitting the indication of the beam tapering configuration, the configuration indication transmitting component 1330 may be configured as or otherwise support a means for transmitting RRC signaling, a DCI message, a MAC-CE, or any combination thereof.

In some examples, the first wireless node includes a UE, an IAB node, a repeater node, a second base station, or any combination thereof.

Figure 14:
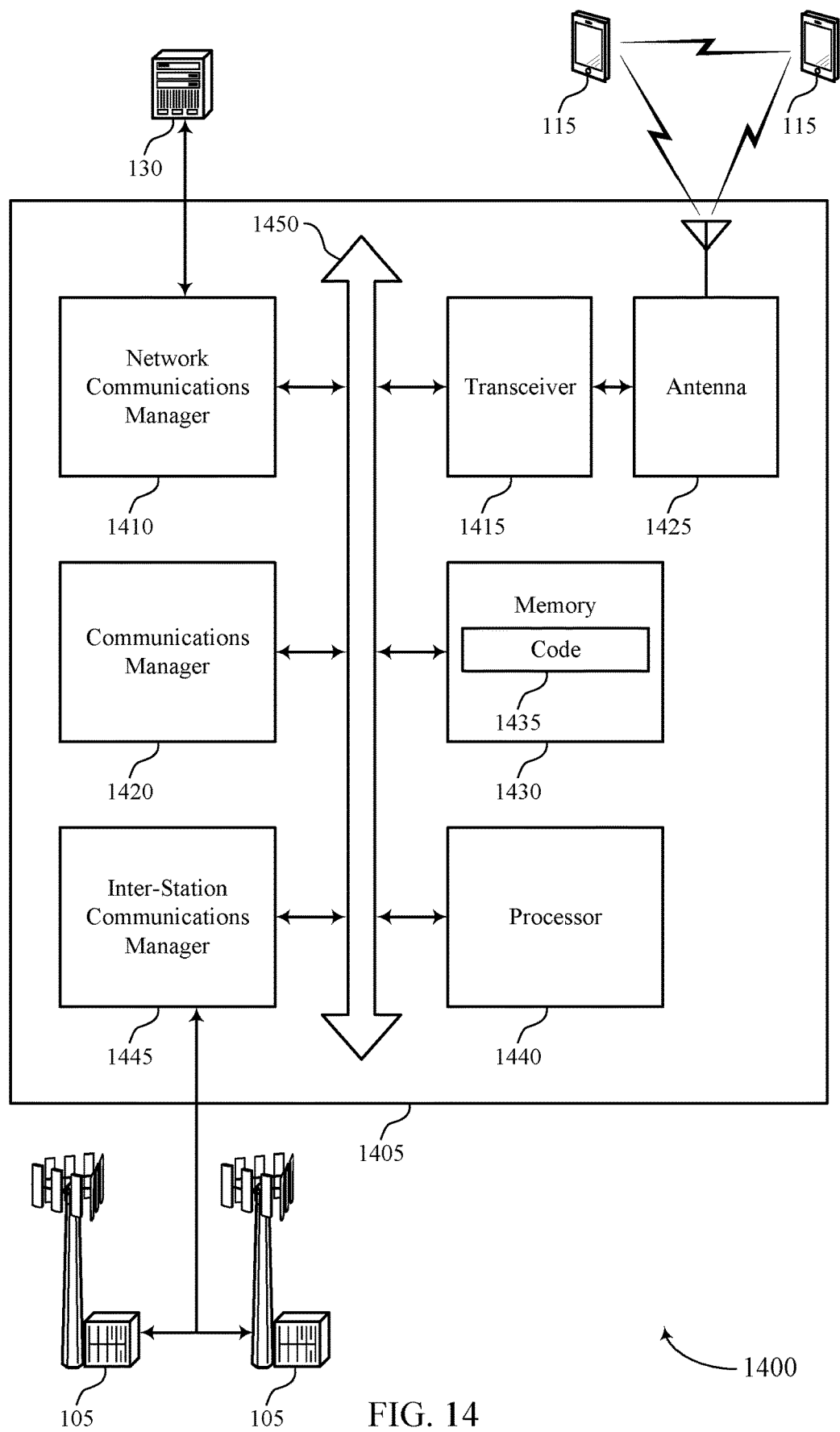
FIG. 14 shows a diagram of a system including a device that supports closed loop spatial interference control in full duplex in accordance with aspects of the present disclosure.

FIG. 14 shows a diagram of a system 1400 including a device 1405 that supports closed loop spatial interference control in full duplex in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting closed loop spatial interference control in full duplex). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a base station in accordance with examples as disclosed herein. For example, the communications manager 1420 may be configured as or otherwise support a means for receiving, from a first wireless node, a capability message indicating that the first wireless node supports a set of multiple beam tapering configurations. The communications manager 1420 may be configured as or otherwise support a means for transmitting, to the first wireless node, an indication of a beam tapering configuration of the set of multiple beam tapering configurations for the first wireless node based on an interference measurement. The communications manager 1420 may be configured as or otherwise support a means for monitoring for a message that is beamformed according to the beam tapering configuration.

By including or configuring the communications manager 1420 in accordance with examples as described herein, the device 1405 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of closed loop spatial interference control in full duplex as described herein, or the processor 1440 and the memory 1430 may be otherwise configured to perform or support such operations.

Figure 15:
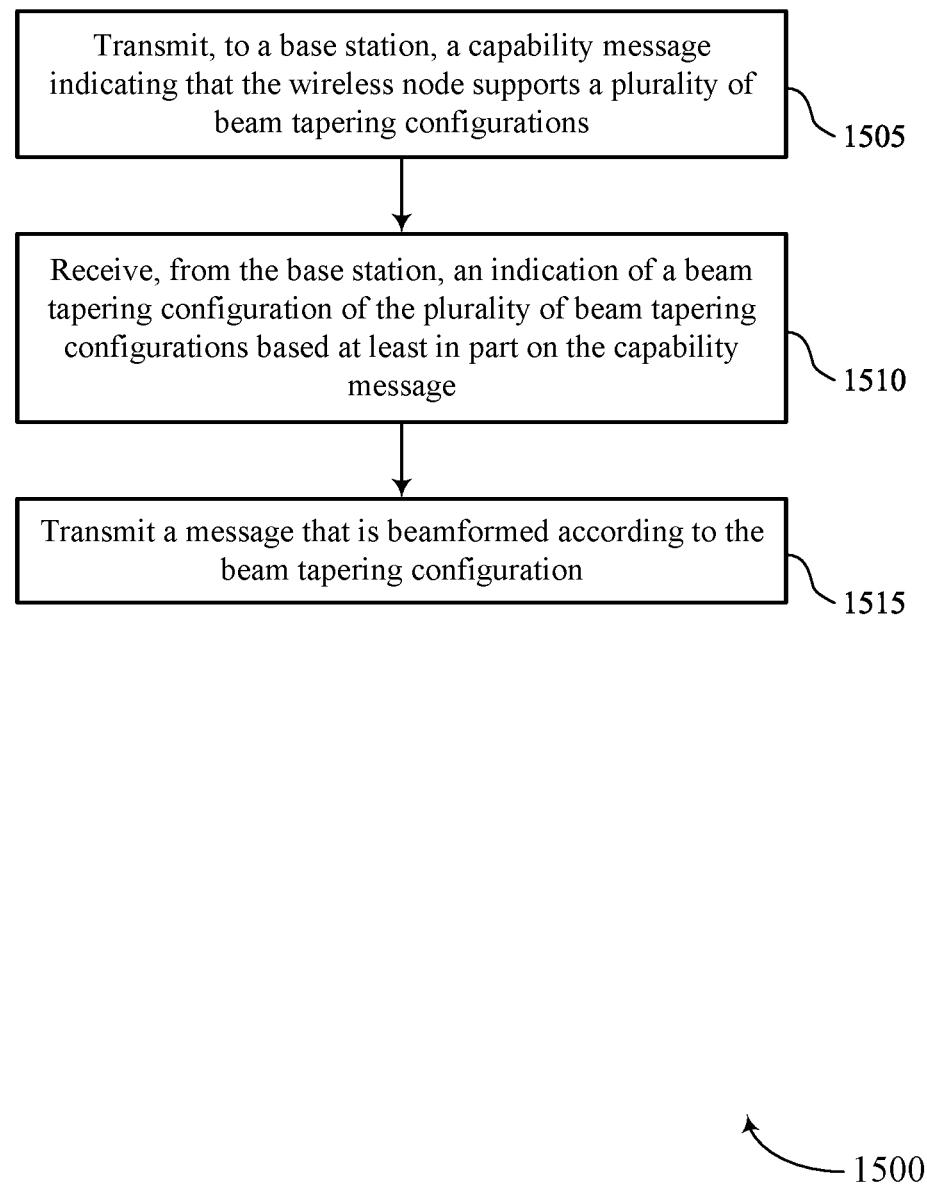
FIGS. 15 through 18 show flowcharts illustrating methods that support closed loop spatial interference control in full duplex in accordance with aspects of the present disclosure.

FIG. 15 shows a flowchart illustrating a method 1500 that supports closed loop spatial interference control in full duplex in accordance with aspects of the present disclosure. The operations of the method 1500 may be implemented by a wireless node or its components as described herein. For example, the operations of the method 1500 may be performed by a wireless node as described with reference to FIGS. 1 through 10. In some examples, a wireless node may execute a set of instructions to control the functional elements of the wireless node to perform the described functions. Additionally or alternatively, the wireless node may perform aspects of the described functions using special-purpose hardware.

At 1505, the method may include transmitting, to a base station, a capability message indicating that the wireless node supports a set of multiple beam tapering configurations. The operations of 1505 may be performed in accordance with examples as disclosed herein. In some examples, aspects of the operations of 1505 may be performed by a capability message transmitting component 925 as described with reference to FIG. 9.

At 1510, the method may include receiving, from the base station, an indication of a beam tapering configuration of the set of multiple beam tapering configurations based on the capability message. The operations of 1510 may be performed in accordance with examples as disclosed herein. In some examples, aspects of the operations of 1510 may be performed by a configuration indication receiving component 930 as described with reference to FIG. 9.

At 1515, the method may include transmitting a message that is beamformed according to the beam tapering configuration. The operations of 1515 may be performed in accordance with examples as disclosed herein. In some examples, aspects of the operations of 1515 may be performed by a beamformed message transmitting component 935 as described with reference to FIG. 9.

Figure 16:
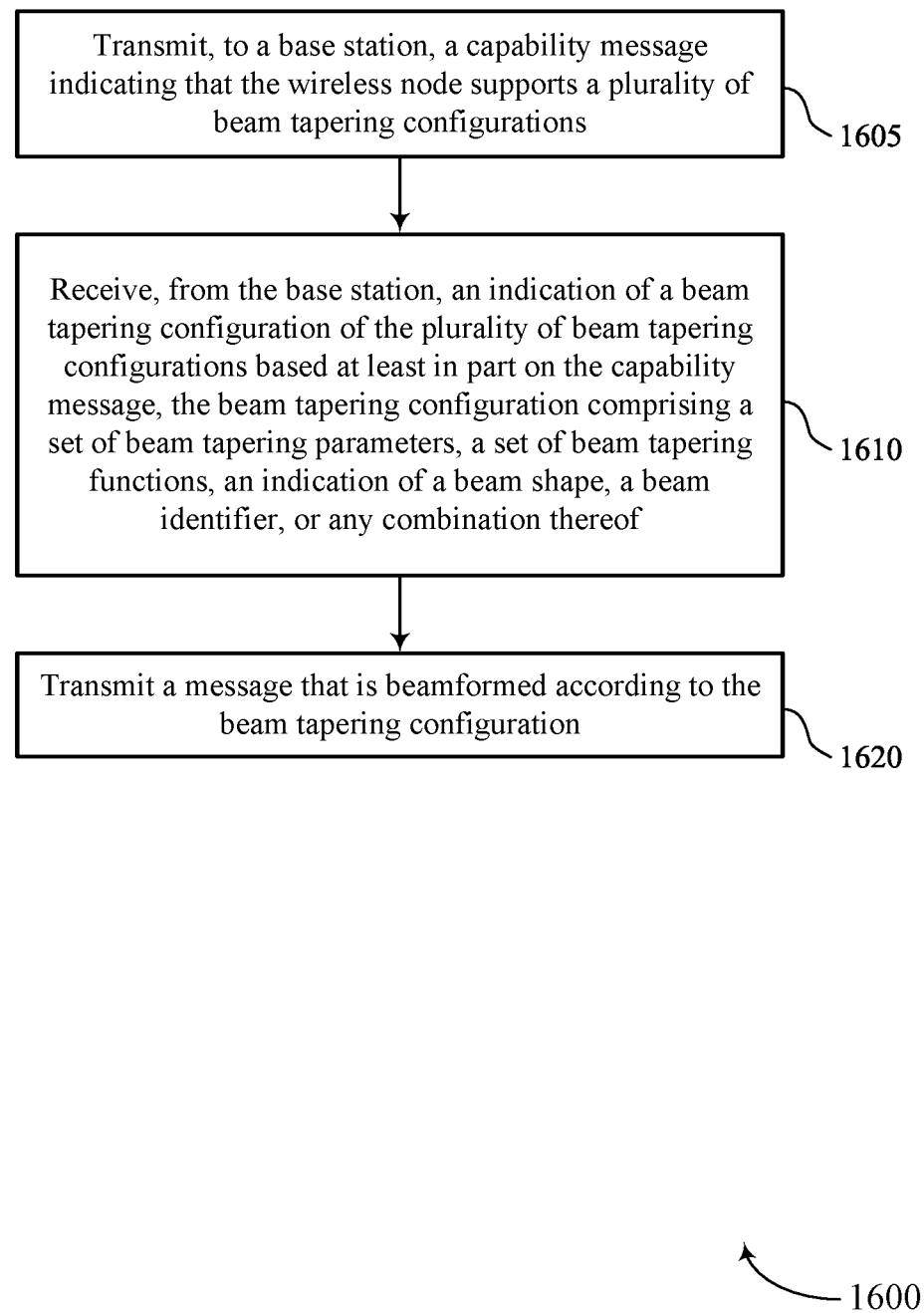

FIG. 16 shows a flowchart illustrating a method 1600 that supports closed loop spatial interference control in full duplex in accordance with aspects of the present disclosure. The operations of the method 1600 may be implemented by a wireless node or its components as described herein. For example, the operations of the method 1600 may be performed by a wireless node as described with reference to FIGS. 1 through 10. In some examples, a wireless node may execute a set of instructions to control the functional elements of the wireless node to perform the described functions. Additionally or alternatively, the wireless node may perform aspects of the described functions using special-purpose hardware.

At 1605, the method may include transmitting, to a base station, a capability message indicating that the wireless node supports a set of multiple beam tapering configurations. The operations of 1605 may be performed in accordance with examples as disclosed herein. In some examples, aspects of the operations of 1605 may be performed by a capability message transmitting component 925 as described with reference to FIG. 9.

At 1610, the method may include receiving, from the base station, an indication of a beam tapering configuration of the set of multiple beam tapering configurations based on the capability message, the beam tapering configuration comprising a set of beam tapering parameters, a set of beam tapering functions, an indication of a beam shape, a beam identifier, or any combination thereof. The operations of 1610 may be performed in accordance with examples as disclosed herein. In some examples, aspects of the operations of 1610 may be performed by a configuration indication receiving component 930 as described with reference to FIG. 9.

At 1615, the method may include transmitting a message that is beamformed according to the beam tapering configuration. The operations of 1615 may be performed in accordance with examples as disclosed herein. In some examples, aspects of the operations of 1615 may be performed by a beamformed message transmitting component 935 as described with reference to FIG. 9.

Figure 17:
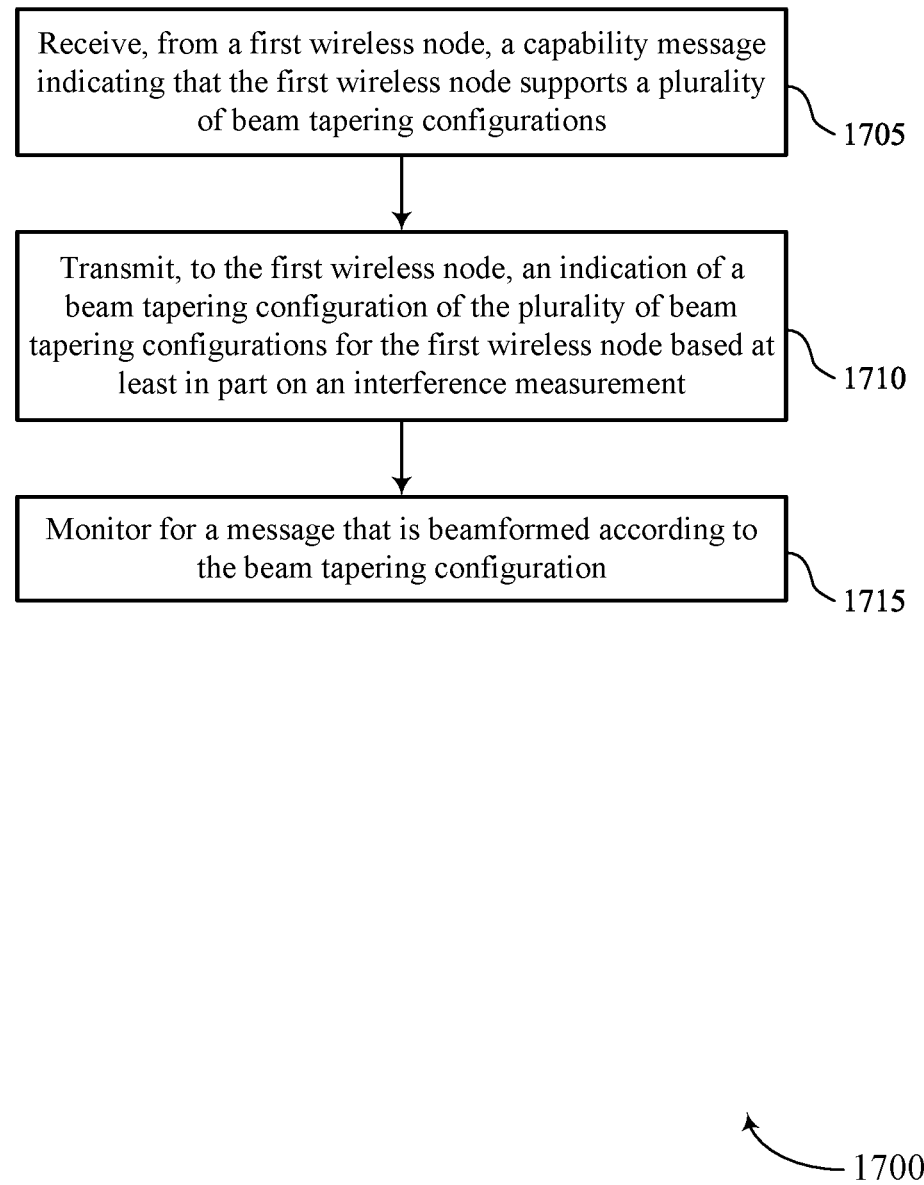

FIG. 17 shows a flowchart illustrating a method 1700 that supports closed loop spatial interference control in full duplex in accordance with aspects of the present disclosure. The operations of the method 1700 may be implemented by a base station or its components as described herein. For example, the operations of the method 1700 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1705, the method may include receiving, from a first wireless node, a capability message indicating that the first wireless node supports a set of multiple beam tapering configurations. The operations of 1705 may be performed in accordance with examples as disclosed herein. In some examples, aspects of the operations of 1705 may be performed by a capability message receiving component 1325 as described with reference to FIG. 13.

At 1710, the method may include transmitting, to the first wireless node, an indication of a beam tapering configuration of the set of multiple beam tapering configurations for the first wireless node based on an interference measurement. The operations of 1710 may be performed in accordance with examples as disclosed herein. In some examples, aspects of the operations of 1710 may be performed by a configuration indication transmitting component 1330 as described with reference to FIG. 13.

At 1715, the method may include monitoring for a message that is beamformed according to the beam tapering configuration. The operations of 1715 may be performed in accordance with examples as disclosed herein. In some examples, aspects of the operations of 1715 may be performed by a beamformed message monitoring component 1335 as described with reference to FIG. 13.

Figure 18:
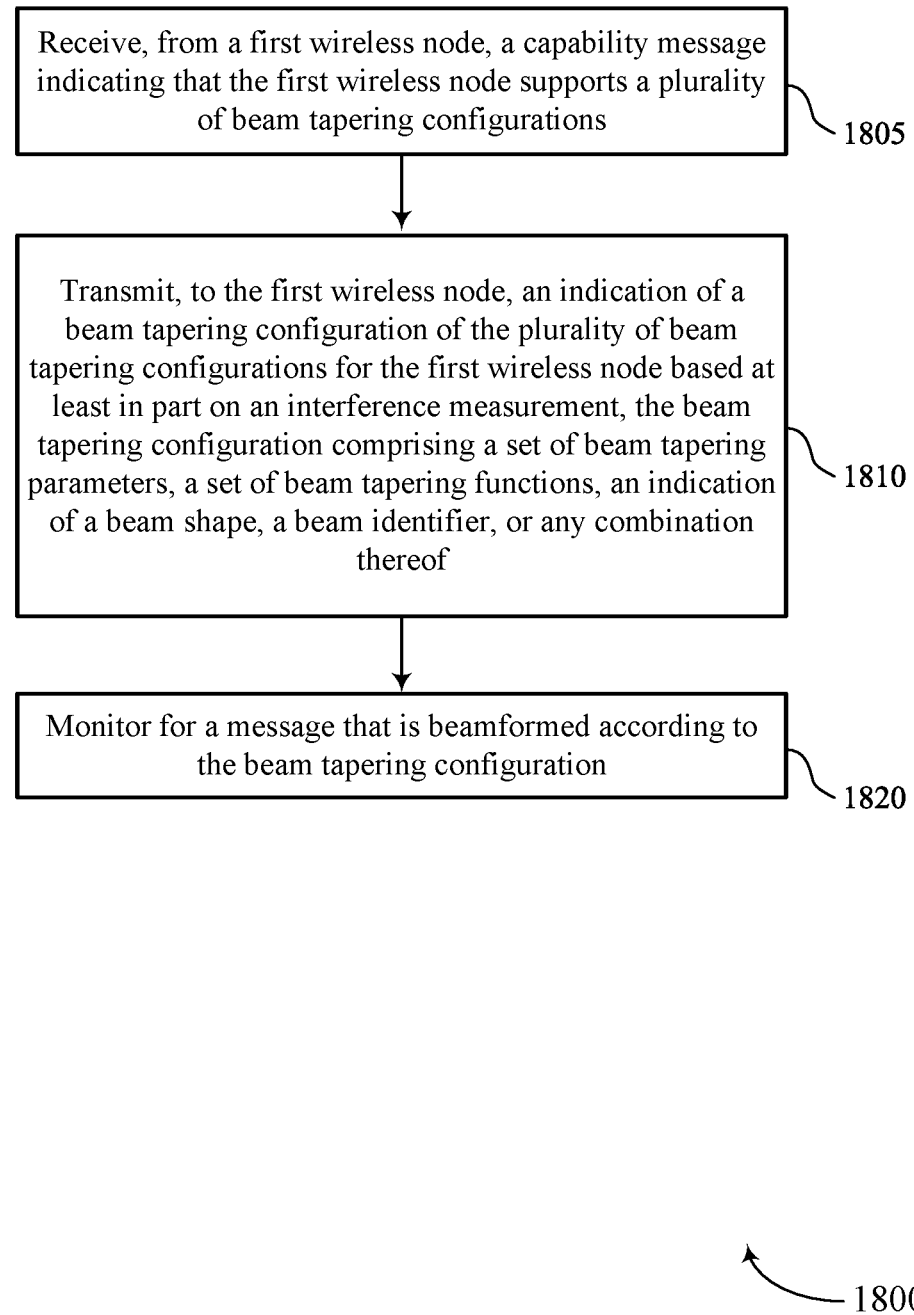

FIG. 18 shows a flowchart illustrating a method 1800 that supports closed loop spatial interference control in full duplex in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include receiving, from a first wireless node, a capability message indicating that the first wireless node supports a set of multiple beam tapering configurations. The operations of 1805 may be performed in accordance with examples as disclosed herein. In some examples, aspects of the operations of 1805 may be performed by a capability message receiving component 1325 as described with reference to FIG. 13.

At 1810, the method may include transmitting, to the first wireless node, an indication of a beam tapering configuration of the set of multiple beam tapering configurations for the first wireless node based on an interference measurement, the beam tapering configuration comprising a set of beam tapering parameters, a set of beam tapering functions, an indication of a beam shape, a beam identifier, or any combination thereof. The operations of 1810 may be performed in accordance with examples as disclosed herein. In some examples, aspects of the operations of 1810 may be performed by a configuration indication transmitting component 1330 as described with reference to FIG. 13.

At 1815, the method may include monitoring for a message that is beamformed according to the beam tapering configuration. The operations of 1815 may be performed in accordance with examples as disclosed herein. In some examples, aspects of the operations of 1815 may be performed by a beamformed message monitoring component 1335 as described with reference to FIG. 13.

The following provides an overview of aspects of the present disclosure:

Aspect 1: A method for wireless communications at a wireless node, comprising: transmitting, to a base station, a capability message indicating that the wireless node supports a plurality of beam tapering configurations; receiving, from the base station, an indication of a beam tapering configuration of the plurality of beam tapering configurations based at least in part on the capability message; and transmitting a message that is beamformed according to the beam tapering configuration.

Aspect 2: The method of aspect 1, wherein receiving the indication of the beam tapering configuration further comprises: receiving the indication of the beam tapering configuration comprising a set of beam tapering parameters, a set of beam tapering functions, an indication of a beam shape, a beam identifier, or any combination thereof.

Aspect 3: The method of any of aspects 1 through 2, wherein receiving the indication of the beam tapering configuration further comprises: receiving the indication of the beam tapering configuration comprising a bit map defining a transmission pattern for utilizing one or more beam tapering configurations of the plurality of beam tapering configurations over a plurality of time slots.

Aspect 4: The method of any of aspects 1 through 3, wherein receiving the indication of the beam tapering configuration further comprises: receiving the indication of the beam tapering configuration comprising an indication that the beam tapering configuration is associated with a resource type.

Aspect 5: The method of any of aspects 1 through 4, wherein receiving the indication of the beam tapering configuration further comprises: receiving the indication of the beam tapering configuration comprising an indication that the beam tapering configuration is associated with a mode of operation, wherein the mode of operation comprises a half-duplexing mode, an FD mode, an enhanced duplexing mode, a spatial division multiplexing mode, or any combination thereof.

Aspect 6: The method of any of aspects 1 through 5, wherein receiving the indication of the beam tapering configuration further comprises: receiving the indication of the beam tapering configuration comprising an indication that the beam tapering configuration is associated with a traffic type or a channel type.

Aspect 7: The method of any of aspects 1 through 6, wherein receiving the indication of the beam tapering configuration further comprises: receiving the indication of the beam tapering configuration comprising an indication that the beam tapering configuration is associated with a geographic location, a permitted velocity, one or more mobility parameters, or any combination thereof.

Aspect 8: The method of any of aspects 1 through 7, wherein transmitting the capability message further comprises: transmitting the capability message comprising a set of supported beam tapering parameters, a set of supported beam tapering functions, a set of supported beam shapes, a set of supported beam identifiers, or any combination thereof.

Aspect 9: The method of any of aspects 1 through 8, further comprising: receiving, from the base station, an instruction to transmit one or more signals according to one or more of the plurality of beam tapering configurations; and transmitting, to the base station, the one or more signals according to the one or more of the plurality of beam tapering configurations, wherein receiving the indication of the beam tapering configuration is based at least in part on transmitting the one or more signals.

Aspect 10: The method of aspect 9, further comprising: receiving, from the base station, an indication of a QCL relationship between the one or more of the plurality of beam tapering configurations, wherein receiving the instruction is based at least in part on receiving the indication of the QCL relationship.

Aspect 11: The method of any of aspects 1 through 10, wherein receiving the indication of the beam tapering configuration further comprises: receiving RRC signaling, a DCI message, a MAC-CE, or any combination thereof.

Aspect 12: The method of any of aspects 1 through 11, wherein the wireless node comprises a UE, an IAB node, a repeater node, a second base station, or any combination thereof.

Aspect 13: A method for wireless communications at a base station, comprising: receiving, from a first wireless node, a capability message indicating that the first wireless node supports a plurality of beam tapering configurations; transmitting, to the first wireless node, an indication of a beam tapering configuration of the plurality of beam tapering configurations for the first wireless node based at least in part on an interference measurement; and monitoring for a message that is beamformed according to the beam tapering configuration.

Aspect 14: The method of aspect 13, wherein transmitting the indication of the beam tapering configuration further comprises: transmitting the indication of the beam tapering configuration comprising a set of beam tapering parameters, a set of beam tapering functions, an indication of a beam shape, a beam identifier, or any combination thereof.

Aspect 15: The method of any of aspects 13 through 14, wherein transmitting the indication of the beam tapering configuration further comprises: transmitting the indication of the beam tapering configuration comprising a bit map defining a transmission pattern for utilizing one or more beam tapering configurations of the plurality of beam tapering configurations over a plurality of time slots.

Aspect 16: The method of any of aspects 13 through 15, wherein transmitting the indication of the beam tapering configuration further comprises: transmitting the indication of the beam tapering configuration comprising an indication that the beam tapering configuration is associated with a resource type.

Aspect 17: The method of any of aspects 13 through 16, wherein transmitting the indication of the beam tapering configuration further comprises: transmitting the indication of the beam tapering configuration comprising an indication that the beam tapering configuration is associated with a mode of operation, wherein the mode of operation comprises a half-duplexing mode, an FD mode, an enhanced duplexing mode, a spatial division multiplexing mode, or any combination thereof.

Aspect 18: The method of any of aspects 13 through 17, wherein transmitting the indication of the beam tapering configuration further comprises: transmitting the indication of the beam tapering configuration comprising an indication that the beam tapering configuration is associated with a traffic type or a channel type.

Aspect 19: The method of any of aspects 13 through 18, wherein transmitting the indication of the beam tapering configuration further comprises: transmitting the indication of the beam tapering configuration comprising an indication that the beam tapering configuration is associated with a geographic location, a permitted velocity, one or more mobility parameters, or any combination thereof.

Aspect 20: The method of any of aspects 13 through 19, wherein receiving the capability message further comprises: receiving the capability message comprising a set of supported beam tapering parameters, a set of supported beam tapering functions, a set of supported beam shapes, a set of supported beam identifiers, or any combination thereof.

Aspect 21: The method of any of aspects 13 through 20, further comprising: transmitting, to the first wireless node, an instruction to transmit one or more signals according to one or more of the plurality of beam tapering configurations; receiving, from the first wireless node, the one or more signals according to the one or more of the plurality of beam tapering configurations; and performing one or more measurements on each of the one or more signals, wherein transmitting the indication of the beam tapering configuration is based at least in part on performing the one or more measurements.

Aspect 22: The method of aspect 21, further comprising: transmitting, to the first wireless node, an indication of a QCL relationship between the one or more of the plurality of beam tapering configurations, wherein receiving the one or more signals is based at least in part on transmitting the indication of the QCL relationship.

Aspect 23: The method of any of aspects 13 through 22, further comprising: receiving, from a second wireless node, an interference measurement report comprising an indication of interference caused by the first wireless node, the second wireless node, or any combination thereof, wherein transmitting the indication of the beam tapering configuration of the plurality of beam tapering configurations is based at least in part on receiving the interference measurement report.

Aspect 24: The method of any of aspects 13 through 23, wherein transmitting the indication of the beam tapering configuration further comprises: transmitting RRC signaling, a DCI message, a MAC-CE, or any combination thereof.

Aspect 25: The method of any of aspects 13 through 24, wherein the first wireless node comprises a UE, an IAB node, a repeater node, a second base station, or any combination thereof.

Aspect 26: An apparatus for wireless communications at a wireless node, comprising a processor; memory coupled with the processor; and instructions stored in the memory and executable by the processor to cause the apparatus to perform a method of any of aspects 1 through 12.

Aspect 27: An apparatus for wireless communications at a wireless node, comprising at least one means for performing a method of any of aspects 1 through 12.

Aspect 28: A non-transitory computer-readable medium storing code for wireless communications at a wireless node, the code comprising instructions executable by a processor to perform a method of any of aspects 1 through 12.

Aspect 29: An apparatus for wireless communications at a base station, comprising a processor; memory coupled with the processor; and instructions stored in the memory and executable by the processor to cause the apparatus to perform a method of any of aspects 13 through 25.

Aspect 30: An apparatus for wireless communications at a base station, comprising at least one means for performing a method of any of aspects 13 through 25.

Aspect 31: A non-transitory computer-readable medium storing code for wireless communications at a base station, the code comprising instructions executable by a processor to perform a method of any of aspects 13 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium.

Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a wireless node, comprising:
   transmitting, to a base station, a capability message indicating that the wireless node supports a plurality of beam tapering configurations;
   receiving, from the base station, an indication of a beam tapering configuration of the plurality of beam tapering configurations based at least in part on the capability message; and
   transmitting a message that is beamformed according to the beam tapering configuration.

2. The method of claim 1, wherein receiving the indication of the beam tapering configuration further comprises:
   receiving the indication of the beam tapering configuration comprising a set of beam tapering parameters, a set of beam tapering functions, an indication of a beam shape, a beam identifier, or any combination thereof.

3. The method of claim 1, wherein receiving the indication of the beam tapering configuration further comprises:
   receiving the indication of the beam tapering configuration comprising a bit map defining a transmission pattern for utilizing one or more beam tapering configurations of the plurality of beam tapering configurations over a plurality of time slots.

4. The method of claim 1, wherein receiving the indication of the beam tapering configuration further comprises:
   receiving the indication of the beam tapering configuration comprising an indication that the beam tapering configuration is associated with a resource type.

5. The method of claim 1, wherein receiving the indication of the beam tapering configuration further comprises:
   receiving the indication of the beam tapering configuration comprising an indication that the beam tapering configuration is associated with a mode of operation, wherein the mode of operation comprises a half-duplexing mode, a full-duplexing mode, an enhanced duplexing mode, a spatial division multiplexing mode, or any combination thereof.

6. The method of claim 1, wherein receiving the indication of the beam tapering configuration further comprises:
   receiving the indication of the beam tapering configuration comprising an indication that the beam tapering configuration is associated with a traffic type or a channel type.

7. The method of claim 1, wherein receiving the indication of the beam tapering configuration further comprises:
   receiving the indication of the beam tapering configuration comprising an indication that the beam tapering configuration is associated with a geographic location, a permitted velocity, one or more mobility parameters, or any combination thereof.

8. The method of claim 1, wherein transmitting the capability message further comprises:
   transmitting the capability message comprising a set of supported beam tapering parameters, a set of supported beam tapering functions, a set of supported beam shapes, a set of supported beam identifiers, or any combination thereof.

9. The method of claim 1, further comprising:
   receiving, from the base station, an instruction to transmit one or more signals according to one or more of the plurality of beam tapering configurations; and
   transmitting, to the base station, the one or more signals according to the one or more of the plurality of beam tapering configurations, wherein receiving the indication of the beam tapering configuration is based at least in part on transmitting the one or more signals.

10. The method of claim 9, further comprising:
    receiving, from the base station, an indication of a quasi co-location relationship between the one or more of the plurality of beam tapering configurations, wherein receiving the instruction is based at least in part on receiving the indication of the quasi co-location relationship.

11. The method of claim 1, wherein receiving the indication of the beam tapering configuration further comprises:
receiving radio resource control (RRC) signaling, a downlink control information (DCI) message, a medium access control (MAC) control element (MAC-CE), or any combination thereof.

12. The method of claim 1, wherein the wireless node comprises a user equipment (UE), an integrated access backhaul (IAB) node, a repeater node, a second base station, or any combination thereof.

13. A method for wireless communications at a base station, comprising:
receiving, from a first wireless node, a capability message indicating that the first wireless node supports a plurality of beam tapering configurations;
transmitting, to the first wireless node, an indication of a beam tapering configuration of the plurality of beam tapering configurations for the first wireless node based at least in part on an interference measurement; and
monitoring for a message that is beamformed according to the beam tapering configuration.

14. The method of claim 13, wherein transmitting the indication of the beam tapering configuration further comprises:
transmitting the indication of the beam tapering configuration comprising a set of beam tapering parameters, a set of beam tapering functions, an indication of a beam shape, a beam identifier, or any combination thereof.

15. The method of claim 13, wherein transmitting the indication of the beam tapering configuration further comprises:
transmitting the indication of the beam tapering configuration comprising a bit map defining a transmission pattern for utilizing one or more beam tapering configurations of the plurality of beam tapering configurations over a plurality of time slots.

16. The method of claim 13, wherein transmitting the indication of the beam tapering configuration further comprises:
transmitting the indication of the beam tapering configuration comprising an indication that the beam tapering configuration is associated with a resource type.

17. The method of claim 13, wherein transmitting the indication of the beam tapering configuration further comprises:
transmitting the indication of the beam tapering configuration comprising an indication that the beam tapering configuration is associated with a mode of operation, wherein the mode of operation comprises a half-duplexing mode, a full-duplexing mode, an enhanced duplexing mode, a spatial division multiplexing mode, or any combination thereof.

18. The method of claim 13, wherein transmitting the indication of the beam tapering configuration further comprises:
transmitting the indication of the beam tapering configuration comprising an indication that the beam tapering configuration is associated with a traffic type or a channel type.

19. The method of claim 13, wherein transmitting the indication of the beam tapering configuration further comprises:
transmitting the indication of the beam tapering configuration comprising an indication that the beam tapering configuration is associated with a geographic location, a permitted velocity, one or more mobility parameters, or any combination thereof.

20. The method of claim 13, wherein receiving the capability message further comprises:
receiving the capability message comprising a set of supported beam tapering parameters, a set of supported beam tapering functions, a set of supported beam shapes, a set of supported beam identifiers, or any combination thereof.

21. The method of claim 13, further comprising:
transmitting, to the first wireless node, an instruction to transmit one or more signals according to one or more of the plurality of beam tapering configurations;
receiving, from the first wireless node, the one or more signals according to the one or more of the plurality of beam tapering configurations; and
performing one or more measurements on each of the one or more signals, wherein transmitting the indication of the beam tapering configuration is based at least in part on performing the one or more measurements.

22. The method of claim 21, further comprising:
transmitting, to the first wireless node, an indication of a quasi co-location relationship between the one or more of the plurality of beam tapering configurations, wherein receiving the one or more signals is based at least in part on transmitting the indication of the quasi co-location relationship.

23. The method of claim 13, further comprising:
receiving, from a second wireless node, an interference measurement report comprising an indication of interference caused by the first wireless node, the second wireless node, or any combination thereof, wherein transmitting the indication of the beam tapering configuration of the plurality of beam tapering configurations is based at least in part on receiving the interference measurement report.

24. The method of claim 13, wherein transmitting the indication of the beam tapering configuration further comprises:
transmitting radio resource control (RRC) signaling, a downlink control information (DCI) message, a medium access control (MAC) control element (MAC-CE), or any combination thereof.

25. The method of claim 13, wherein the first wireless node comprises a user equipment (UE), an integrated access backhaul (IAB) node, a repeater node, a second base station, or any combination thereof.

26. An apparatus for wireless communications at a wireless node, comprising:
a memory; and
a processor coupled to the memory and configured to:
transmit, to a base station, a capability message indicating that the wireless node supports a plurality of beam tapering configurations;
receive, from the base station, an indication of a beam tapering configuration of the plurality of beam tapering configurations based at least in part on the capability message; and
transmit a message that is beamformed according to the beam tapering configuration.

27. The apparatus of claim 26, wherein the processor coupled to the memory and configured to receive the indication of the beam tapering configuration is further configured to:
receive the indication of the beam tapering configuration comprising a set of beam tapering parameters, a set of beam tapering functions, an indication of a beam shape, a beam identifier, or any combination thereof.

28. The apparatus of claim 26, wherein the processor coupled to the memory and configured to receive the indication of the beam tapering configuration is further configured to:
receive the indication of the beam tapering configuration comprising a bit map defining a transmission pattern for utilizing one or more beam tapering configurations of the plurality of beam tapering configurations over a plurality of time slots.

29. An apparatus for wireless communications at a base station, comprising:
a memory; and
a processor coupled to the memory and configured to:
receive, from a first wireless node, a capability message indicating that the first wireless node supports a plurality of beam tapering configurations;
transmit, to the first wireless node, an indication of a beam tapering configuration of the plurality of beam tapering configurations for the first wireless node based at least in part on an interference measurement; and
monitor for a message that is beamformed according to the beam tapering configuration.

30. The apparatus of claim 29, wherein the processor coupled to the memory and configured to transmit the indication of the beam tapering configuration is further configured to:
transmit the indication of the beam tapering configuration comprising a set of beam tapering parameters, a set of beam tapering functions, an indication of a beam shape, a beam identifier, or any combination thereof.

* * * * *